(12) United States Patent
Shipman

(10) Patent No.: US 10,246,005 B2
(45) Date of Patent: Apr. 2, 2019

(54) ILLUMINATED VEHICULAR ASSEMBLY FOR DAY AND NIGHT USE

(71) Applicant: Michael Shipman, Newport Coast, CA (US)

(72) Inventor: Michael Shipman, Newport Coast, CA (US)

( * ) Notice: Subject to any disclaimer, the term of this patent is extended or adjusted under 35 U.S.C. 154(b) by 0 days.

(21) Appl. No.: 16/185,951

(22) Filed: Nov. 9, 2018

(65) Prior Publication Data

US 2019/0070999 A1    Mar. 7, 2019

Related U.S. Application Data

(63) Continuation-in-part of application No. 15/907,023, filed on Feb. 27, 2018, which is a continuation of
(Continued)

(51) Int. Cl.
*B60Q 1/26* (2006.01)
*B60Q 1/50* (2006.01)
(Continued)

(52) U.S. Cl.
CPC .......... *B60Q 1/2611* (2013.01); *B60Q 1/2696* (2013.01); *B60Q 1/503* (2013.01); *F21K 9/64* (2016.08); *F21S 43/14* (2018.01); *F21S 43/235* (2018.01); *F21V 9/06* (2013.01); *G02B 5/208* (2013.01); *G09F 13/18* (2013.01); *G09F 13/20* (2013.01); *G09F 13/22* (2013.01);
(Continued)

(58) Field of Classification Search
CPC .... B60Q 1/2611; B60Q 1/2696; B60Q 1/503; F21K 9/64; F21S 43/14; F21S 43/235; F21V 9/06; G02B 5/208; G09F 13/18; G09F 13/20; G09F 13/22; G09F 21/04; G09F 2013/222; G09F 2013/225; G09F 2013/227
See application file for complete search history.

(56) References Cited

U.S. PATENT DOCUMENTS 1,192,982 A    8/1916    Bristol et al.
1,373,167 A    3/1921    Brooks
(Continued)

FOREIGN PATENT DOCUMENTS

| EP | 1696404 A1 * | 8/2006 | ............... G09F 9/33 |
| GB | 2434908 A * | 8/2007 | ............. B60R 13/10 |
| WO | WO-0048166 A1 * | 8/2000 | ............. G06F 13/22 |

*Primary Examiner* — Mary Ellen Bowman
(74) *Attorney, Agent, or Firm* — David Duckworth

(57) ABSTRACT

A vehicle lighting system is provided primarily for use with emergency response vehicles. The vehicle lighting system includes at least one luminescent planar sheet affixed to a vehicle's mounting surface. The luminescent planar sheet includes a non-luminescent printed circuit board in the shape of a letter or number which has a top surface of a color which contrasts with the mounting surface's color. The luminescent planar sheet includes a plurality of light emitting LEDs which are surface mounted upon the printed circuit board so as to be arranged in the shape of the desired letter or number with the LEDs covering no more than 20% of the printed circuit board's top surface. Preferably, the LEDs cover no more than 7% the printed circuit board's top surface.

15 Claims, 29 Drawing Sheets

Related U.S. Application Data application No. 15/593,817, filed on May 12, 2017, now Pat. No. 9,919,645, which is a continuation of application No. 14/736,997, filed on Jun. 11, 2015, now Pat. No. 9,656,597, which is a continuation of application No. 14/512,171, filed on Oct. 10, 2014, now Pat. No. 9,682,648, which is a continuation-in-part of application No. 14/070,925, filed on Nov. 4, 2013, now Pat. No. 9,010,976, which is a continuation-in-part of application No. 13/385,697, filed on Mar. 2, 2012, now Pat. No. 8,585,263.

(60) Provisional application No. 61/464,515, filed on Mar. 4, 2011.

(51) Int. Cl.

| | | |
|---|---|---|
| F21K 9/64 | (2016.01) | |
| F21V 9/06 | (2018.01) | |
| G02B 5/20 | (2006.01) | |
| F21S 43/14 | (2018.01) | |
| G09F 13/18 | (2006.01) | |
| G09F 13/20 | (2006.01) | |
| G09F 13/22 | (2006.01) | |
| G09F 21/04 | (2006.01) | |
| F21S 43/235 | (2018.01) | |

(52) U.S. Cl.
CPC ........ *G09F 21/04* (2013.01); *G09F 2013/222* (2013.01); *G09F 2013/225* (2013.01); *G09F 2013/227* (2013.01)

(56) References Cited

U.S. PATENT DOCUMENTS

| | | | |
|---|---|---|---|
| 2,891,140 A | 1/1958 | Huff | |
| 3,305,745 A | 2/1967 | Clock | |
| 4,028,828 A | 6/1977 | Chao et al. | |
| 4,426,028 A | 1/1984 | Bott | |
| 4,645,970 A | 2/1987 | Murphy | |
| 4,879,826 A * | 11/1989 | Wittke | B60R 13/00 |
| | | | 40/551 |
| 5,211,466 A | 5/1993 | Jarocki et al. | |
| 5,255,164 A | 10/1993 | Eidelman | |
| 5,359,796 A | 11/1994 | Werling | |
| 5,497,572 A | 3/1996 | Hoffman | |
| 5,636,462 A | 6/1997 | Kleiman | |
| 5,711,100 A | 1/1998 | Elmer | |
| 5,884,997 A | 3/1999 | Stanuch et al. | |
| 5,934,797 A | 8/1999 | Schlaudroff et al. | |
| 6,056,425 A | 5/2000 | Appelberg | |
| 6,081,191 A | 6/2000 | Green et al. | |
| 6,449,889 B1 | 9/2002 | Hottenstein | |
| 6,623,151 B2 | 9/2003 | Pederson | |
| 6,735,893 B2 | 5/2004 | Wolf | |
| 6,955,455 B2 | 10/2005 | Schneider | |
| 7,118,239 B2 | 10/2006 | Itoh et al. | |
| 7,121,700 B1 | 10/2006 | Scanlon | |
| 7,350,949 B2 | 4/2008 | Meinke et al. | |
| 7,387,414 B2 | 6/2008 | Helms | |
| 7,467,846 B2 | 12/2008 | Kaoh | |
| 7,468,677 B2 | 12/2008 | Pederson et al. | |
| 7,589,622 B2 | 9/2009 | Farley | |
| 7,621,662 B1 | 11/2009 | Colbert | |
| 7,635,209 B2 | 12/2009 | Uematsu et al. | |
| 7,825,790 B2 | 11/2010 | Tallinger | |
| 7,931,393 B2 | 4/2011 | Stempinski | |
| 8,585,263 B2 * | 11/2013 | Shipman | B60Q 1/2611 |
| | | | 340/472 |
| 9,010,976 B2 * | 4/2015 | Shipman | G09F 13/20 |
| | | | 340/472 |
| 9,656,597 B2 * | 5/2017 | Shipman | B60Q 1/2611 |
| 9,829,192 B2 | 11/2017 | Diekmann et al. | |
| 9,830,841 B2 * | 11/2017 | Shipman | G09F 13/20 |
| 9,919,645 B2 * | 3/2018 | Shipman | B60Q 1/2611 |
| 2002/0062589 A1 | 5/2002 | Miller | |
| 2002/0171542 A1 | 11/2002 | Bloomfield et al. | |
| 2004/0227370 A1 | 11/2004 | Bader et al. | |
| 2004/0231209 A1 | 11/2004 | Love | |
| 2004/0260470 A1 | 12/2004 | Rast | |
| 2005/0018441 A1 | 1/2005 | Menke et al. | |
| 2006/0072303 A1 | 4/2006 | Dunkle et al. | |
| 2007/0008093 A1 | 1/2007 | Nigro et al. | |
| 2007/0103922 A1 | 5/2007 | Rissmiller et al. | |
| 2007/0234612 A1 | 10/2007 | Corbishley et al. | |
| 2007/0242472 A1 * | 10/2007 | Gergets | B60Q 1/2611 |
| | | | 362/493 |
| 2008/0236007 A1 | 10/2008 | Au et al. | |
| 2009/0116257 A1 | 5/2009 | Rosemeyer et al. | |
| 2009/0161377 A1 | 6/2009 | Helms | |
| 2010/0181659 A1 | 7/2010 | Hanson | |
| 2010/0194556 A1 | 8/2010 | LaRosa | |
| 2011/0167689 A1 | 7/2011 | Ford | |
| 2011/0252675 A1 | 10/2011 | Thomas | |

* cited by examiner

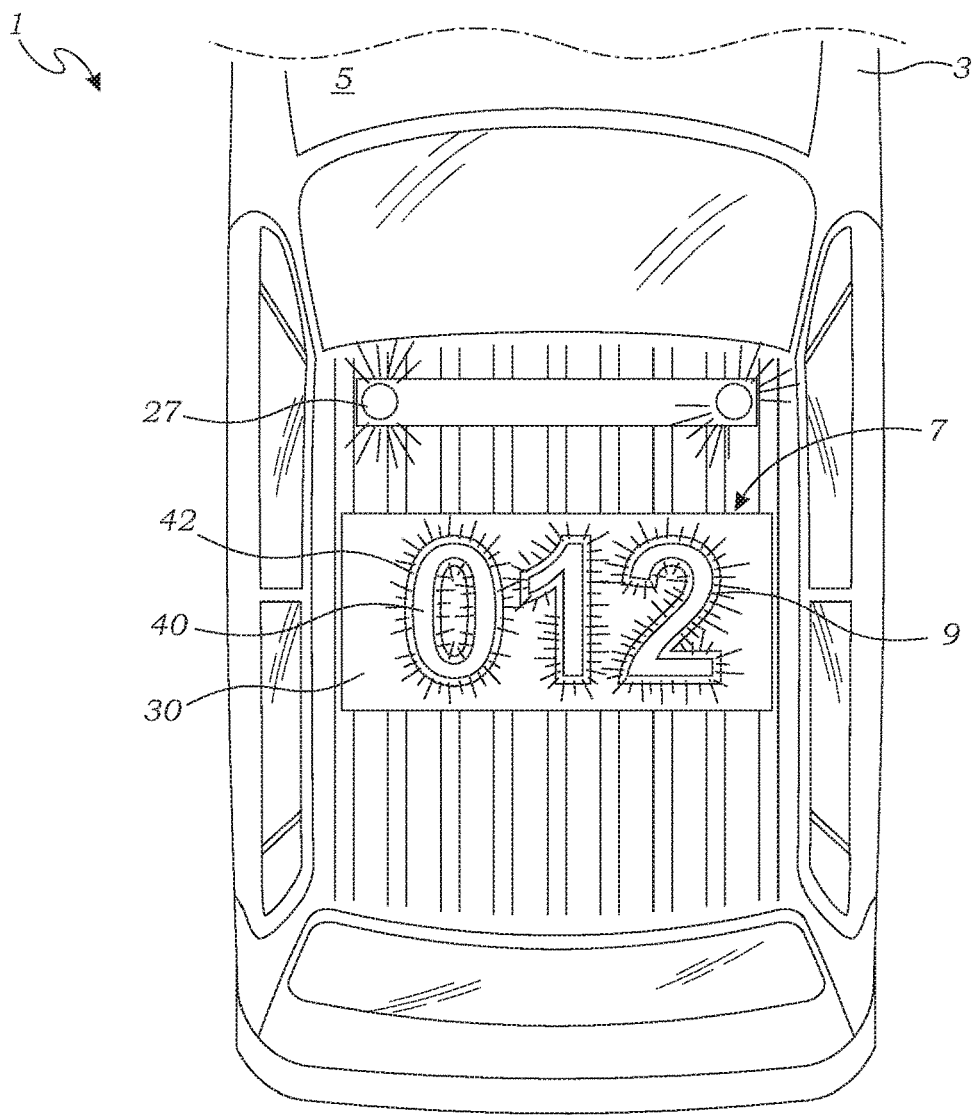
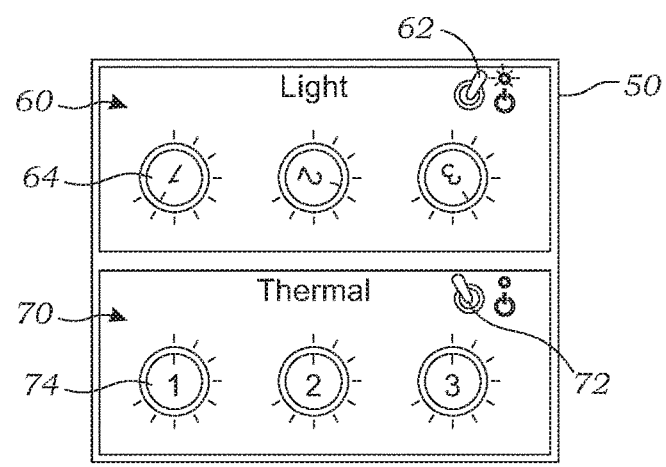
Fig. 14

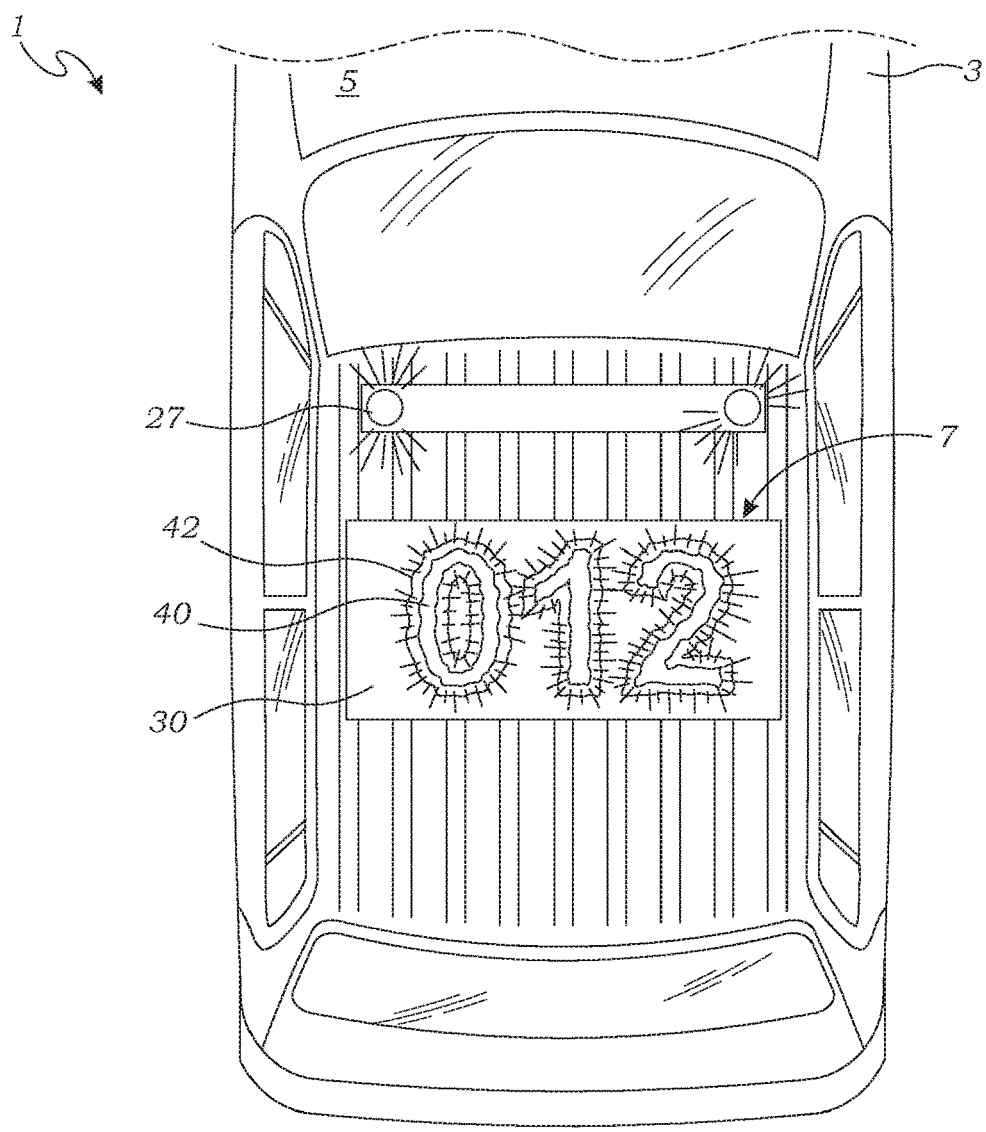
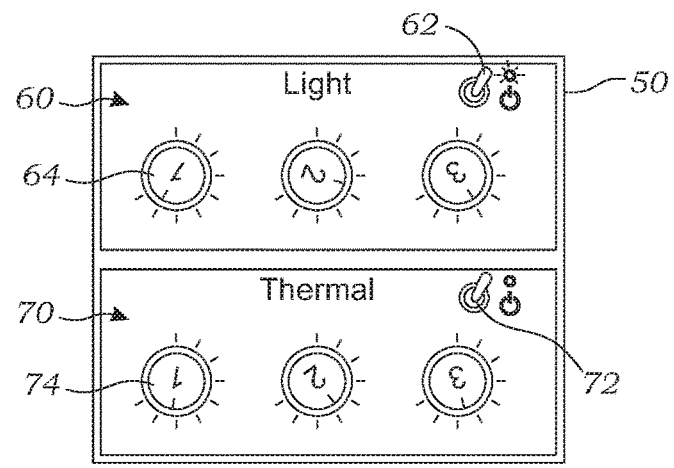
Fig. 16

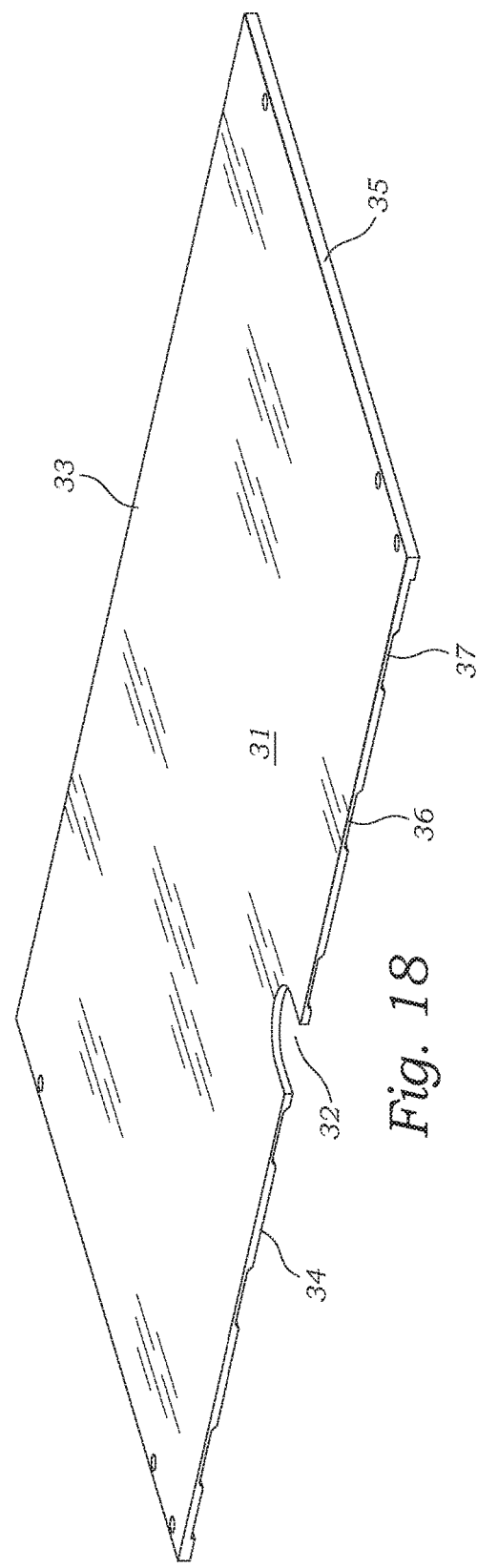
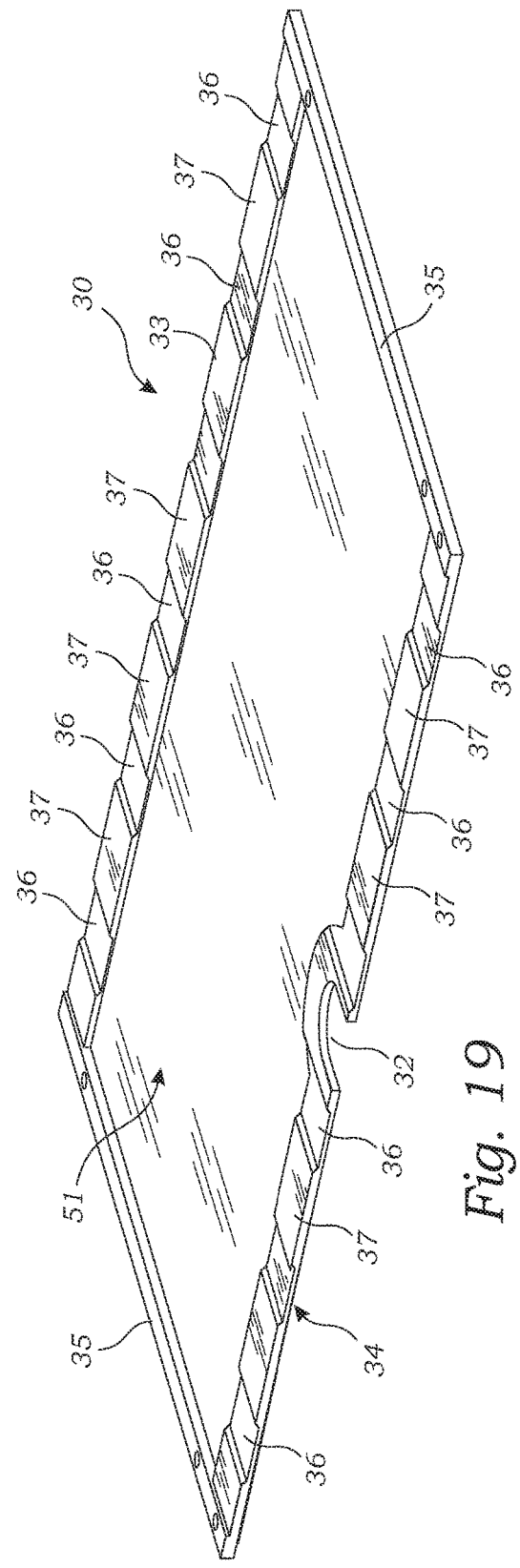

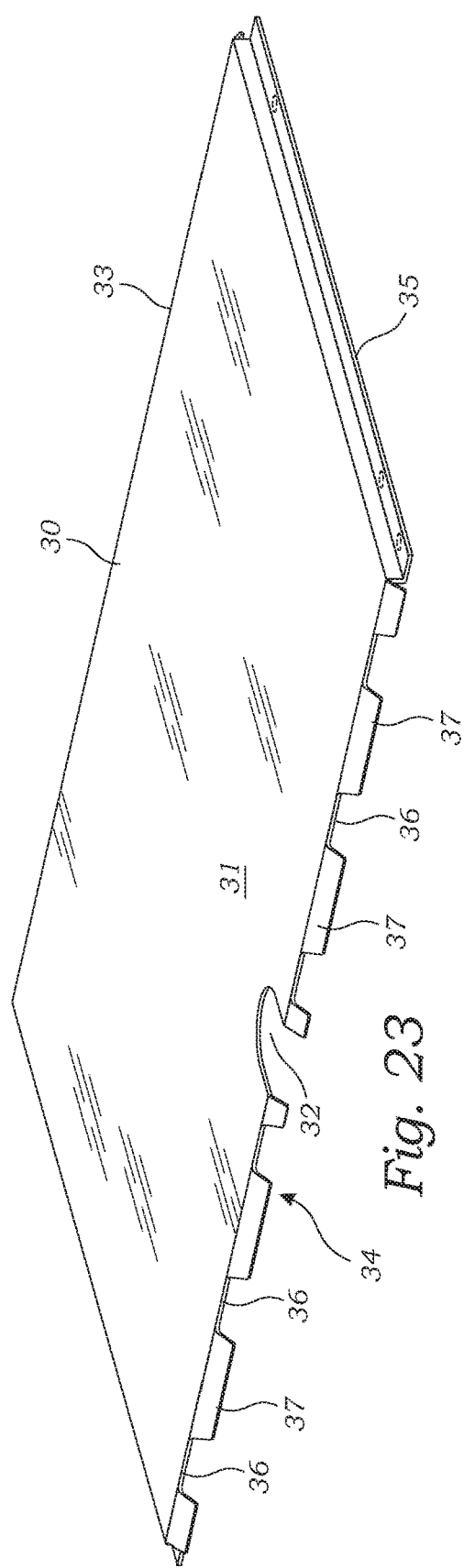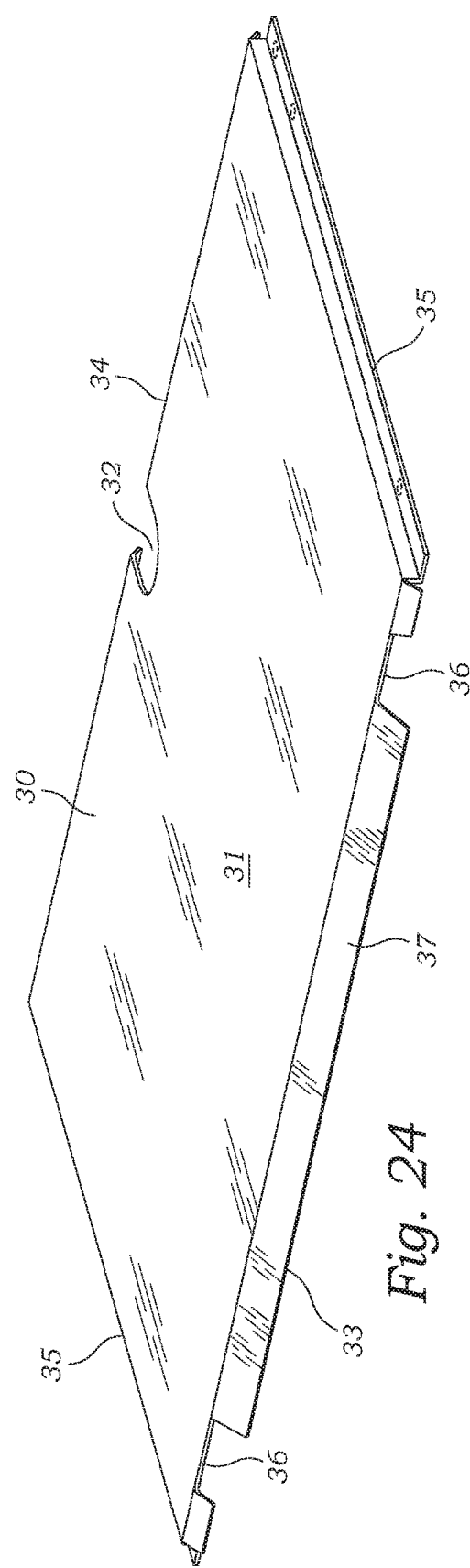

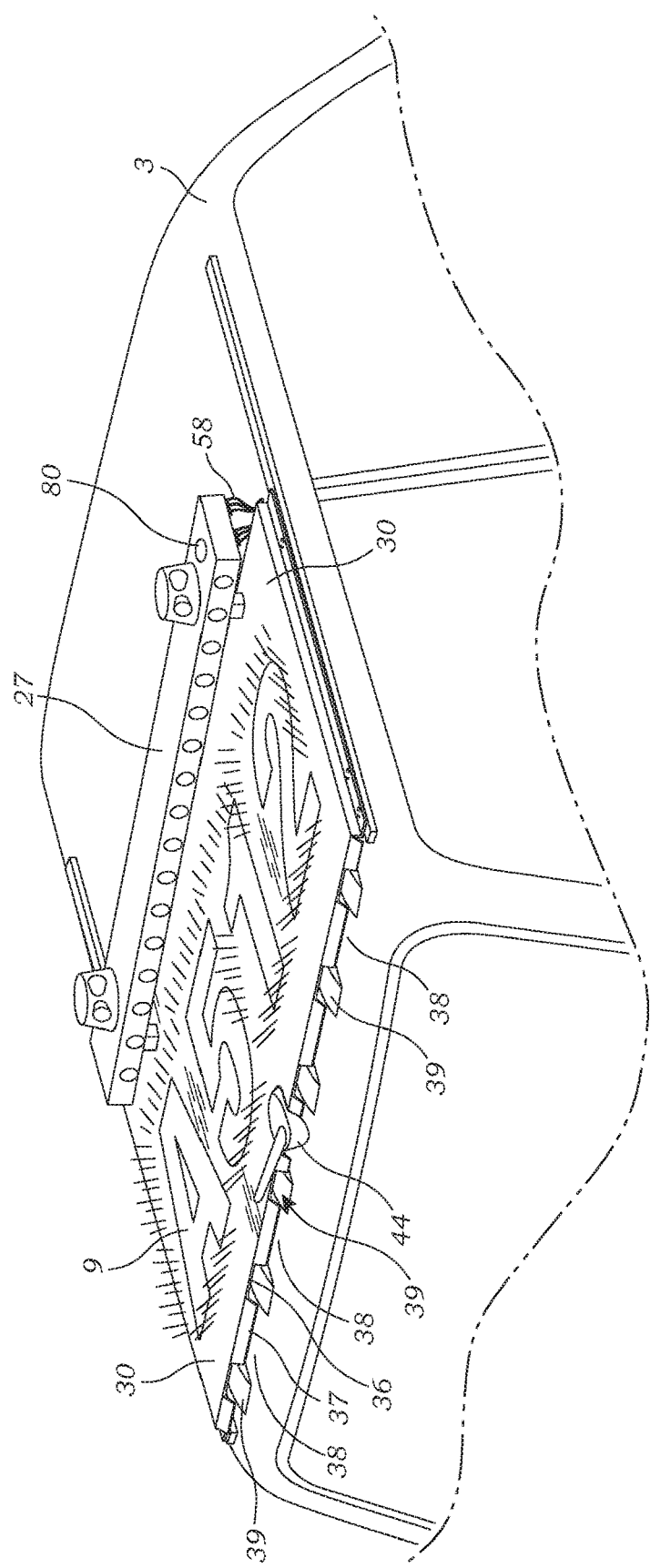

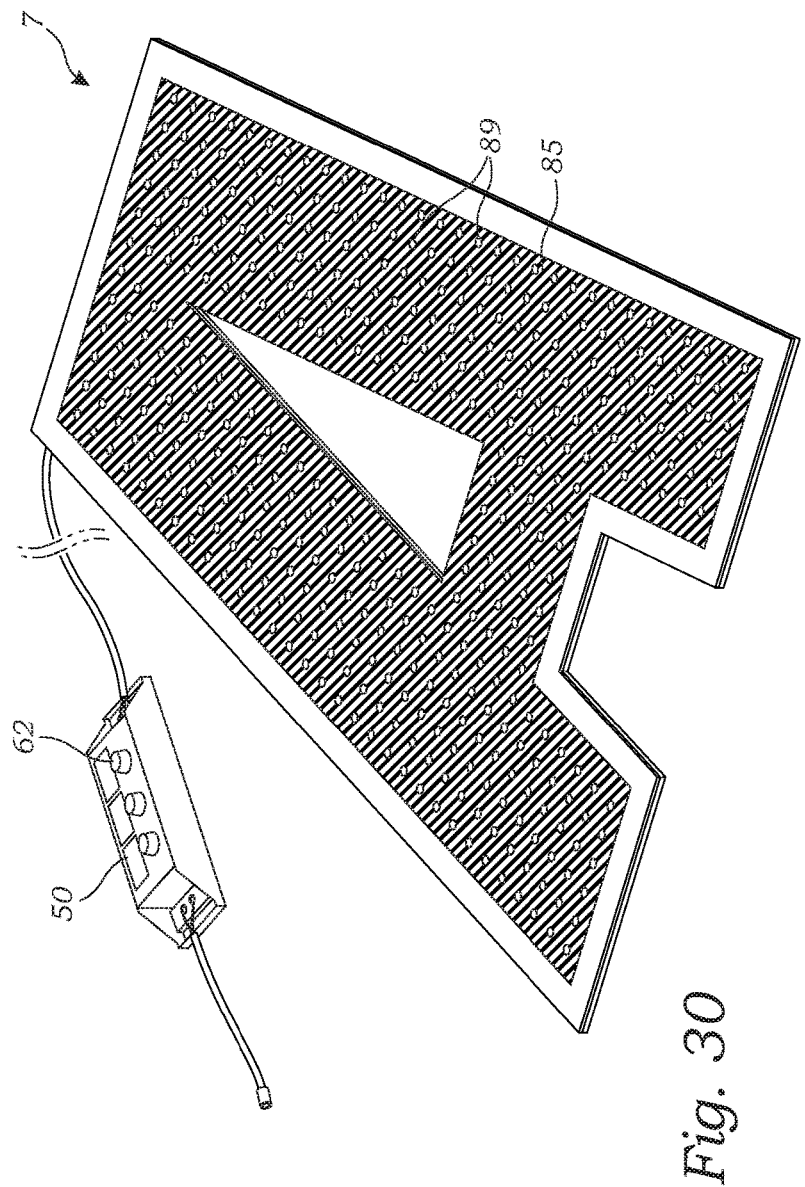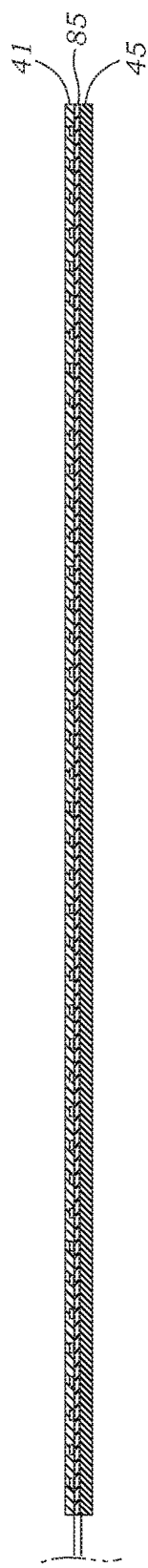

ILLUMINATED VEHICULAR ASSEMBLY FOR DAY AND NIGHT USE

RELATED APPLICATIONS

The present application is a continuation-in-part of U.S. patent application Ser. No. 15/907,023 filed Feb. 27, 2018, which in turn, is a continuation of U.S. patent application Ser. No. 15/593,817 filed May 12, 2017, now U.S. Pat. No. 9,919,645 issued Mar. 20, 2018, which in turn is a continuation of U.S. patent application Ser. No. 14/736,997 filed Jun. 11, 2015, now U.S. Pat. No. 9,656,597 issued May 23, 2017, which in turn is a continuation of U.S. patent application Ser. No. 14/512,171 filed on Oct. 10, 2014, now U.S. Pat. No. 9,682,648 issued Jun. 20, 2017, which in turn is a continuation-in-part application of U.S. patent application Ser. No. 14/070,925 filed on Nov. 4, 2013, now U.S. Pat. No. 9,010,976 issued Apr. 21, 2015, which in turn is a continuation-in-part application of U.S. patent application Ser. No. 13/385,697 filed on Mar. 2, 2012, now U.S. Pat. No. 8,585,263 issued Nov. 19, 2013, which in turn is a continuation-in-part application of U.S. Patent Application Ser. No. 61/464,515 filed on Mar. 4, 2011.

BACKGROUND OF THE INVENTION

The present invention relates to indicia that can be affixed on the planar surfaces of emergency response vehicles such as fire department vehicles, police cars, and ambulances to provide identification and greater visibility.

Most conventional emergency response vehicles provide audible alert warnings and visual alert warnings such as sequenced flashing of head, tail and side light assemblies, or a roof mounted light bar containing at least one light source designed to disburse light in 360 degrees. These lights may be solid, stroboscopic, revolving, flashing, modulated, pulsing, oscillating, alternating, or any combination thereof. Thus, these light systems are designed primarily for viewing from the front, rear, or side of emergency response vehicles.

While in most situations, any of the aforementioned devices would suffice in alerting a passerby of the presence of the emergency response vehicle, there are crucial situations in which greater visibility is required. For example, in the case of vehicular pursuits, helicopter units are often called for service to help ground units observe and track pursuits as well as ensure public safety while in pursuit. Helicopters provide valuable service to law enforcement in general and, more particularly, to the pursuit function. Helicopter units can assist ground units as a platform from which to observe, track and illuminate people or places on the ground. Moreover, the helicopter units serve as backup to ground units, and the helicopter flight crews can provide a perspective that cannot be achieved on the ground. Further, they can communicate with ground units and provide information to direct them toward an intended position or away from a dangerous one. In addition, the helicopter units can provide crucial information, such as reporting whether or not suspects are carrying weapons, etc.

There is a need for a system to assist helicopter units in distinguishing ground units and their positioning. Currently, many police vehicles already have numerals illustrated on top of their roofs. These numerals are used to differentiate a police vehicle from other vehicles and to help identify the police district, the unit, and the individual. However, typically, these numerals are in plain black text and are not illuminated. Therefore, when there is little or no light, it can be difficult to distinguish the numbers on top of a police vehicle.

More recently, the illuminated signs with illuminated alphanumeric characters have been developed which are easy to see and read at night. These assemblies have employed electroluminescent sheets and light sources covered in translucent plastic. Unfortunately, even these lighted systems suffered from serious drawbacks, particularly during the daytime. Typical electro-luminescent panels appear white or light grey when not illuminated. Similarly, light sources covered in translucent plastic also provides a white or grey appearance. When mounted on a white surface, such as the top of an emergency response vehicle painted white, the alphanumeric characters are very difficult to read.

Therefore, there is a need for a better illuminated system for enabling emergency response vehicles to be identified at night.

Furthermore, there is a need for a better illuminated system for enabling emergency response vehicles to be identified during the day.

SUMMARY OF THE INVENTION

The present invention is directed to an illuminating alphanumeric lighting system for emergency response vehicles that is able to enhance the visibility of emergency response vehicles to those in the air, such as in helicopters.

The illuminated lighting system provides indicia, in the form of illuminated letters or numerals, on the top of the substantially planar surfaces of emergency response vehicles, such as upon the vehicle hoods, cabins and trunks. The size of the indicia may vary depending upon the purpose of the lighting system, and the size of the horizontal surface upon which the indicia is placed. However, preferred letters and numerals have a length greater than one (1) foot and a width greater than one-half (½) foot. More preferably, the letters and numbers have a length of one (1) to five (5) feet and a width of one-half (½) foot to two (2) feet. Still more preferred, the letters and numbers have a length of approximately two (2) feet and a width of one (1) foot.

To provide illumination to the illuminated numerals and letters, power is provided from the vehicle's electrical systems, such as from the vehicle's battery and alternator. The electrical wiring and switching system for the luminescent panels can be developed by those skilled in the art. However, in preferred embodiments the vehicle is provided with a conventional light bar that extends horizontally and laterally above the top of a vehicle. The light bar obtains power from the vehicle's electrical system so as to emit light substantially horizontally, preferably 360 degrees. These lights may be solid, stroboscopic, revolving, flashing, modulated, pulsing, oscillating, and/or alternating. Preferably, additional wiring extends from light bar to the luminescent indicia so that the luminescent indicia obtains power from the light bar. Any AC/DC or DC/AC inverters, or voltage, amperage or wattage converters that supply appropriate power to the luminescent indicia may be located within the light bar housing. Furthermore, a lighting system may include a light sensor for automatically disabling the luminescent panels when daylight, or other ambient lighting, is above a predetermined threshold so as to make the light produced by the luminescent indicia unnecessary. The light sensor may be a simple photocell connected to the wiring connecting the power source to the luminescent indicia wherein the photocell automatically opens the electrical circuit, or variably increases the electrical resistance, to inhibit the supply of power to the luminescent indicia. The light sensor (photocell) may be located anywhere on the vehicle. However, in a preferred embodiment, the light sensor is mounted to the vehicle light bar.

The luminescent numerals and letters may be constructed in various manners. As a first example, the luminescent letters and numbers may be made using a light pipe, also known as a light guide, connected to an independent light source. The light source may be any of various available lighting constructions known in the art. For example, the light source may comprise one or more incandescent light bulbs, light emitting diodes, light emitting crystals, etc. Moreover, the light source may produce light which can be selectively varied in color so as to enable the operator to alter the color of the luminescence. For example, the light source may comprise a plurality of diodes with each diode producing different colored light. Selective activation and deactivation of the diodes alone or in combination will produce illumination in different colors.

The light guide may be constructed in various shapes and of various materials such as of lengths of acrylic plastic, polycarbonate, or glass to form the desired letters or numerals for display from the top of a vehicle. Alternatively, the light pipe may be constructed of one or more fiber optic fibers or cables. The light pipes may also be constructed of one or more different translucent and fluorescent colored materials for projecting light of one or more colors. An acceptable colored material includes "scintillating plastic" which is typically an acrylic plastic incorporating different colored fluorescent dyes. Preferably, the light guide includes a reflecting bottom layer for directing light upwardly so as to be seen from above.

Where the light guide incorporates fiber optic cables, the fiber optic cables are also constructed to project light laterally from their cylindrical exterior as opposed to predominantly from their distal extremities. This can be accomplished by notching, knurling, scratching or in other manners creating flaws in the otherwise smooth exterior cylindrical surface of the fiber optic cable. These flaws have been found to interrupt the transmission of light along the length of the fiber optic cable and to transmit light laterally from the exterior surface of the fiber optic cable, typically opposite the side which has been flawed.

In an additional preferred embodiment of the present invention, the luminescent letters and numbers are constructed of substantially planar electroluminescent (EL) panels. A first EL construction is described in U.S. Pat. No. 5,045,755 issued to Appelberg and assigned to ELite Technologies, Inc. which is incorporated herein by reference. The illuminating sheet is a split electrode or parallel plate lamp consisting of a main body sandwiched between first and second conductive layers. Application of an alternating current to the planar sheet provides a luminescent sheet which is formed in the shape of numerals and letters.

An additional preferred electroluminescent panel for producing the luminescent letters and numbers can be obtained from MKS, Inc. located in Bridgeton, N.J., USA under the trademark designation Quantaflex™. The Quantaflex™ material is an electroluminescent lamp including luminescent phosphors embedded in the dielectric medium of a capacitor constructed in the form of a sheet. Electrodes, including at least one translucent electrode, form the top and bottom layers of the Quantaflex™ material. Upon application of an alternating current to the electrodes, the phosphors give off photons producing light in the visible spectrum of light. An advantage of the Quantaflex™ material is that the phosphors can be selectively encapsulated between the electrode layers of the luminescent sheet so as to selectively produce patterns of light emitted from the luminescent sheet.

In still additional preferred embodiments, the luminescent numbers and letters are constructed of one of the rapidly developing technologies directed to Organic Light Emitting Devices (OLED), Transparent Organic Light Emitting Devices (TOLED), or Flexible Organic Light Emitting Devices (FOLED). Descriptions of these technologies are available to those skilled in the art and need not be described in further detail herein.

Unfortunately, even these electroluminescent alphanumeric characters suffer from numerous drawbacks. For example, the electroluminescent panels (including the OLED, TOLED and FOLED constructions described above) have a substantially white appearance when they are not activated. These constructions work very well at night as they provide a pleasing and consistent illumination when activated such as by the introduction of an alternating current. However, during the daytime, these electroluminescent alphanumeric characters are extremely difficult to read if mounted upon a light-colored mounting surface. For example, an alphanumeric character made of a white electroluminescent panel is extremely difficult to read if mounted on a white vehicle body panel.

Accordingly, still an additional preferred embodiment is provided which is ideal for both daytime use and nighttime use. For this embodiment, the luminescent planar sheet includes a printed circuit board (also referred to herein as a "PSB") in the shape of the desired letter or number. Though larger than a typical printed circuit board, the printed circuit board includes the traditional layers of a circuit board which includes one or more layers of nonelectrically conducting substrate. The circuit board substrates are preferably dielectric composite materials. The dielectric composite materials contain a matrix (usually an epoxy resin) and a reinforcement (usually a woven, sometimes nonwoven, glass fibers, sometimes even paper), and in some cases a filler is added to the resin. Throughout the substrate(s), the printed circuit board also includes a plurality of electrically conducting pathways, also commonly referred to as tracks or traces. The printed circuit board substrate mechanically supports and electrically connects electronic components or electrical components using the conductive tracks, as well as pads and other features etched from one or more layers of electrically conductive material, such as copper, laminated onto and/or between sheet layers of the non-conductive substrates. Each track consists of a flat, narrow part of the copper foil that remains after etching. The etching, and corresponding removal of the copper, is accomplished using silk screen printing, photoengraving, PCB milling, laser resist ablation, or laser etching. The traces' resistance, determined by its width, thickness, and length, must be sufficiently low for the current the conductor will carry. In a multi-layer printed circuit board, one entire layer may be mostly solid copper to act as a ground plane for shielding and power return.

Importantly, the printed circuit board has a top surface which displays a color which contrasts with the surface upon which it is intended to be mounted upon. For example, in preferred embodiments the vehicle's mounting surface is either white, yellow or light green and the printed circuit board's top surface is either black, brown, red, blue or dark green. Conversely, in alternative embodiments, the vehicle's mounting surface is a dark color such as black, brown, red, blue or dark green, but the printed circuit board's top surface is white, yellow or light green.

For this embodiment, the luminescent planar sheet further includes a plurality of light sources which are surface mounted upon the printed circuit board wherein the light sources are electrically connected to the substrate's electrically conducting pathways. The light sources may be constructed as can be determined by those skilled in the art. However, it is preferred that the light sources be LEDs which are capable of being surface mounted upon a printed circuit board. To this end, the LEDs have small metal tabs or end caps that are be soldered directly onto the PCB surface. The LEDs are soldered onto the PCB to both electrically connect and mechanically fasten the LEDs to the PCB. Moreover, the LEDs may produce light in either the visible spectrum or produce light primarily in the infrared or ultraviolet spectrums so as to be substantially invisible to the human eye. Preferably, the light sources are mounted substantially uniformly upon the printed circuit board so as to be arranged in the shape of the desired letter or number so that upon illumination of the light sources, an illuminated letter or number is produced.

In a first preferred embodiment employing light sources mounted upon a printed circuit board, the light sources are all surface mountable LEDs which produce light at a peak wavelength between 400 nanometers ("nm") to 760 nm that is visible to the human eye. For this embodiment, the LEDs may produce light in any color such as red, green or blue, or the LEDs may be "RGB" LEDs which can select produce red, green or blue light, or combinations thereof such as white by producing red, green and blue light simultaneously. In an alternative preferred embodiment intended for law enforcement or military utilization night vision goggles, it is preferred that all of the light sources are infrared LEDs which produce infrared light at a peak wavelength above 760 nm that is not visible to the human eye. More preferred, the infrared LEDs produce infrared light at a peak wavelength above 800 nm. In still a third embodiment, the light sources include a mix of LEDs which produce light at a peak wavelength that is visible to the human eye and infrared LEDs which produce light at a wavelength that is not visible to the human eye, and each set of LEDs can be selectively activated or deactivated. Preferably, the light sources obstruct no more than twenty percent (20%) of the surface area of the printed circuit board so that at least eighty percent (80%) of the printed circuit board can be seen. Even more preferably, the surface mounted light sources obstruct no more than ten percent (10%) of the surface area of the printed circuit board so that at least ninety percent (90%) of the printed circuit board's top surface can be seen. Finally, in the most preferred embodiment, the light sources cover no more than seven percent (7%) of the printed circuit board's top surface so that at least ninety-three percent of (93%) the printed circuit board's top surface can be seen.

For the luminescent planar sheet embodiment including a printed circuit board and LEDs, it is preferred that the luminescent planar sheet include an adhesive layer adhered to the bottom surface of the printed circuit board for affixing the luminescent planar sheet to a mounting surface, such as the planar surface of an emergency response vehicle. In addition, it is preferred that the upper surface of the printed circuit board be covered by a transparent protective layer. the transparent layer can be a simple acrylic clear plastic which overlays the top of the printed circuit board. However, it is preferred that the protective layer comprises silicone gel which has been poured in a liquid state upon the top surface of the printed circuit board and allowed to cure into a transparent layer. Preferably, the protective layer is not merely translucent, which allows light from the LEDs to be transmitted through the protective layer, but instead the protective layer is substantially transparent so as to allow the light from the LEDs to be transmitted through the protective layer and permit the printed circuit board's top surface and its color to be easily seen.

In still an additional embodiment illustrated, the luminescent letters and numerals are provided by a panel including dozens or hundreds of rows and columns of LEDs or the like which can be selectably illuminated to form a desired indicia. For this embodiment, it is preferred that the LEDs are connected by wires to a controllable switching system, which in turn is connected to a computer processor or the like. The computer processor, in turn, includes an input device such as a keyboard or control panel to allow controlled independent illumination of selected LEDs to form the desired indicia. Though more expensive and requiring more complicated wiring and processing capabilities to select appropriate illumination to display desired characters, this embodiment allows for the indicia to be rapidly changed as desired.

In a preferred embodiment, the LEDs may produce only infrared light not visible to the human eye and thus only visible through imaging systems such as night vision goggles. Alternatively, infrared light (not visible to the human eye) is produced by introducing a voltage through an electrically resistant material, such as a silver or copper alloy, in the form of the indicia. As but an example, a silver material may be printed to form an elongate electrical circuit upon the substrate material adjacent to the illuminated portion of the electroluminescent portion to provide an invisible light producing section adjacent to the electroluminescent visible light producing section. These non-visible light producing embodiments are advantageous when visible light is not desirable which might alert criminals that law enforcement personnel are approaching, but such law enforcement personnel have imaging systems capable of seeing the non-visible indicia of their comrades' vehicles.

Preferably, the planar luminescent panels in the form of letters and numbers are protected by a protective coating in the form of a laminate sheet. Because the preferred luminescent letters and numerals produce light in both infrared and visible light spectrums, it is preferred that the protective coating allow most of these spectrums of light to pass. However, it is preferred that the protective coating block ultraviolet light which can be harmful to the various electronics such as LEDs or electroluminescent panels. In a preferred embodiment, the protective coating blocks at least 60% of ultraviolet light below 350 nanometers, but allows at least 80% of both visible and infrared light above 450 nanometers. An even more preferred protective coating blocks at least 90% of ultraviolet light below 350 nanometers, but allows at least 85% of visible and infrared light above 500 nanometers.

In the event that the planar luminescent panel produces non-visible infrared indicia produced by heat, it is preferred that the planar luminescent sheet include an insulator layer positioned under the infrared producing layer so as to prevent heat from dissipating into the vehicle's metal surface. In a preferred embodiment, the insulator layer includes a pre-applied adhesive for applying the planar luminescent sheet(s) to a vehicle.

Preferably, a controller in the form of a switching system or computer processor is provided to allow operators to control the operation of the illuminated indicia. Even more preferably, the switching system can selectively strobe the illuminated indicia. In still an additional embodiment, the switching system includes manual or automatic variable resistors for controlling the wattage provided to each illuminated indicia so that the wattage may be varied between each illuminated indicia.

Advantageously, the controller can selectively control the planar light panel to produce infrared light above 760 nanometers, while not producing substantial visible light below 600 nanometers so as to be substantially invisible to the human eye with the protective coating allowing at least 80% transmission of the infrared light through the protective coating. Still an additional advantage of the present invention is that the controller allows the planer light panel to produce only visible light between 400 nanometers and 760 nanometers, or simultaneously produce both visible light between 400 nanometers and 760 nanometers and infrared light above 760 nanometers.

Advantageously, the luminescent numerals and letters may be adhered directly to the roof or top of an emergency response vehicle. However, in an alternative embodiment, a rectangular frame is provided for affixing the luminescent panels to the top of the roof of emergency response vehicles. In still an additional embodiment, a planar roof plate is provided which affixes to the vehicle manufacturer's preexisting female threads formed into the roof of the vehicle which are typically used for mounting a roof rack. Where the vehicle has a corrugated roof forming a plurality of troughs and ridges, preferably the roof plate has a top surface that is substantially planar and a bottom surface that includes a plurality of channels forming elongate teeth positioned and aligned to project into the vehicle's roof's troughs. The roof plate engages and is affixed to the vehicle roof with the roof plate's teeth extending into the vehicle roof trough so as to provide better aerodynamics and to provide better support for items mounted to the plate's upper surface. Indicia, antenna, or light bars may be mounted to the roof plate's top surface.

In a preferred embodiment, the planar roof plate has a top wall including the top surface, two sidewalls, a front wall and a rear wall. Small holes, ports or slots may be drilled or formed into the top wall, left and right sidewalls, or front and rear walls for the routing of electrical wiring. However, it is preferred that the two sidewalls, front wall and rear wall are sized and constructed to engage the vehicle roof substantially along their lengths to form a central cavity between the vehicle roof and top wall. Where the vehicle roof is not corrugated but instead relatively smooth, it is preferred that the planar roof plate's front and rear walls also be relatively smooth to conform and engage the vehicle's top surface. However, where the vehicle has a corrugated roof forming a plurality of troughs and ridges, preferably the roof plate front wall and/or rear wall includes channels forming elongate teeth positioned and aligned to project into the vehicle's roof's troughs. It is preferred that any wiring to a light bar or luminescent indicia upon the roof plate be located in the central cavity for the protection of the wiring and to reduce aerodynamic drag that might be produced by the wiring.

Once mounted directly to the roof of a vehicle or upon the planar roof plate, the illuminated numerals and letters are easily visible to those in the air.

Thus, it is an additional object of the invention to provide a structure for identifying emergency response vehicles from the air, such as by those in planes and helicopters.

Further, it is an object of the present invention to provide an improved vehicular external lighting system capable of operating with a low current draw and able to be simply integrated into an existing vehicle's electrical system.

These and other more specific objects and advantages of the invention will be apparent to those skilled in the art from the following detailed description taken in conjunction with the drawings.

BRIEF DESCRIPTION OF THE DRAWINGS

FIG. 14 is a top plan view of the luminescent panels, planar plate, vehicle, and controller of FIG. 13 wherein the controller has activated and adjusted the wattage provided to the electroluminescent indicia;

FIG. 16 is a top plan view of the luminescent panels, planar plate, vehicle, and controller of FIG. 13 wherein the controller has activated and adjusted the wattage provided to the infrared/thermal indicia, and the controller has activated and adjusted the wattage provided to the electroluminescent indicia;

FIG. 18 is a top, right, rear perspective view of a second embodiment of the vehicular roof plate;

FIG. 19 is a bottom, left, rear perspective view of the second embodiment of the vehicle roof plate;

FIG. 23 is a top, right, rear perspective view of a third embodiment of the vehicular roof plate;

FIG. 24 is a top, left, front perspective view of the third embodiment of the vehicle roof plate;

FIG. 29 is a top perspective view illustrating the third embodiment of the vehicular roof plate affixed to the corrugated roof of a vehicle and supporting emergency response vehicle identification characters and a light bar;

FIG. 30 is a top perspective view illustrating an additional embodiment of a preferred luminescent panel including a printed circuit board supporting surface mounted LEDs;

FIG. 31 is a side view illustrating the preferred luminescent panel including a printed circuit board supporting surface mounted LEDs as shown in FIG. 30;

DETAILED DESCRIPTION OF THE INVENTION

Figure 1:
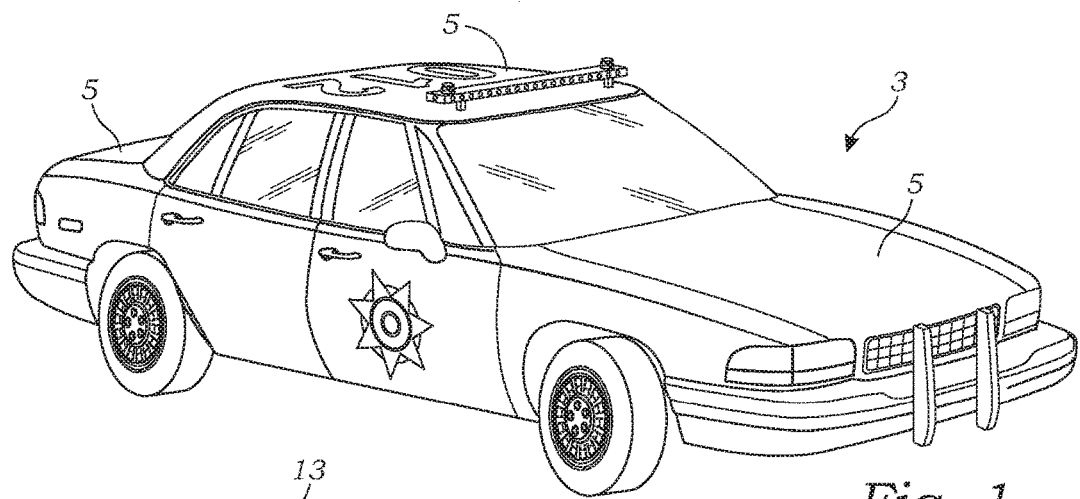
FIG. 1 is a perspective view of an emergency response vehicle equipped with illuminated indicia affixed on top of the roof.

While the present invention is susceptible of embodiment in various forms, as shown in the drawings, hereinafter will be described the presently preferred embodiment of the invention with the understanding that the present disclosure is to be considered as an exemplification of the invention, and it is not intended to limit the invention to the specific embodiments illustrated.

With reference to FIGS. 1-36, the present invention is a vehicular illuminated sign 1. The vehicular illuminated sign comprises two primary components including the vehicle 3 and luminescent planar sheet 7. The terms "vehicle" and "luminescent planar sheet" are to be interpreted broadly as to encompass a wide variety of embodiments as would be understood by those skilled in the art. For example, the vehicle 3 is any wheeled vehicle for travel upon the roads and highway of this country including automobiles, trucks, vans, etc. The present invention is intended primarily for emergency response vehicles. However, the invention may have application for identifying trucking fleets and the like. Each of these vehicles have substantially horizontal planar surfaces 5, such as the hood, cabin top, and trunk illustrated in FIGS. 6 and 7.

The luminescent planar sheet 7 of the present invention is mounted upon one or more of the vehicle's horizontal planar surfaces 5. The luminescent planar sheet 7 is mounted substantially horizontally so as to display indicia 9 upwardly, and thus emit light in a direction perpendicular to the vehicle's horizontal planar surface 5. The indicia 9 is in the form of one or more alpha-numeric characters having a length (commonly referred to as a height) and a width. The alpha-numeric characters are provided to identify a vehicle, and thus are preferably unique to that vehicle. The alpha-numeric characters may have any height or width as necessary so as to identify the vehicle from the air. However, the alpha-numeric characters preferably have a length greater than 1 ft. and a width greater than ½ ft. Still more preferably, each of these numbers or letters forming the indicia has a length of approximately 2 ft. and a width of 1 ft.

The luminescent planar sheets may be constructed to produce light in various colors, and may switch between different colors. In still an additional embodiment of the present invention, the luminescent planar sheet may be constructed to produce light which is primarily invisible to the human eye such as in the infrared spectrum. The term "primarily invisible to the human eye" is intended to be interpreted broadly because traditional light sources producing light in the infrared spectrum, including heat producing systems, will often produce a minimal amount of light in the visible spectrum. However, as understood by those skilled in the art, such infrared/thermal light sources are highly visible when wearing night vision goggles or the like.

The luminescent planar sheet is connected to a power system mounted within the vehicle. The power system may be in the form of a battery separate from the vehicle's traditional battery mounted under the hood. However, preferably the illuminated vehicular sign utilizes the power system already provided in a vehicle including the battery and alternator. To control the power to the luminescent planar sheet 7, preferably one or more switches are positioned within the vehicle's cabin so as to control the on or off illumination of the sign. Further, switches may be provided to control the brightness of the illumination and/or color being illuminated. For example, the signage may change colors so as to indicate different events. For example, the luminescent planar sheet may be made to illuminate red in the event of an emergency. Alternatively, the luminescent planar sheet may be made to strobe in the event of an emergency. Switching systems for providing these features can be easily deduced by those skilled in the art and are not described further herein.

Figure 2:
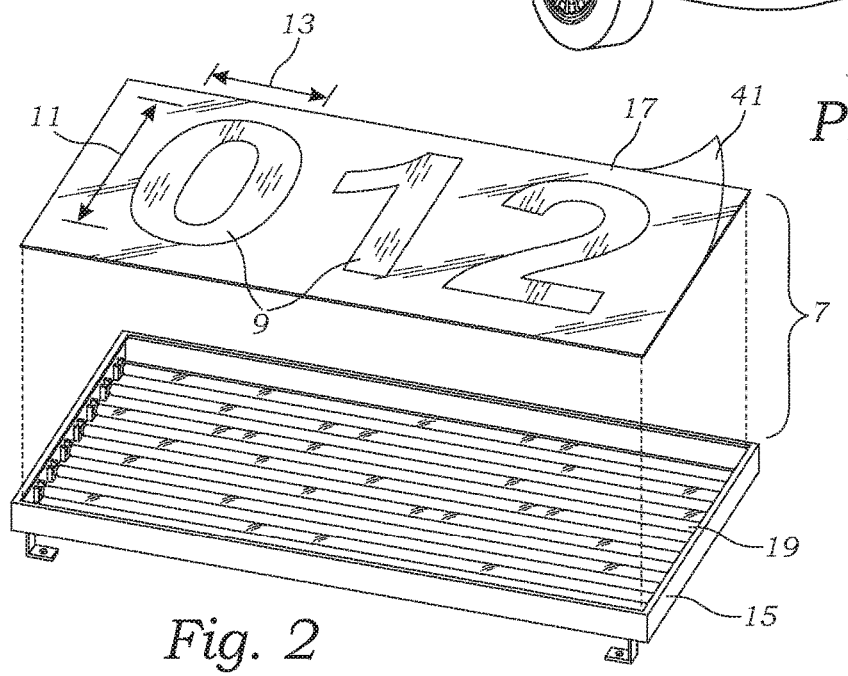
FIG. 2 is a top-exploded view of a frame possessing luminescent panels of the present invention.
Figure 3:
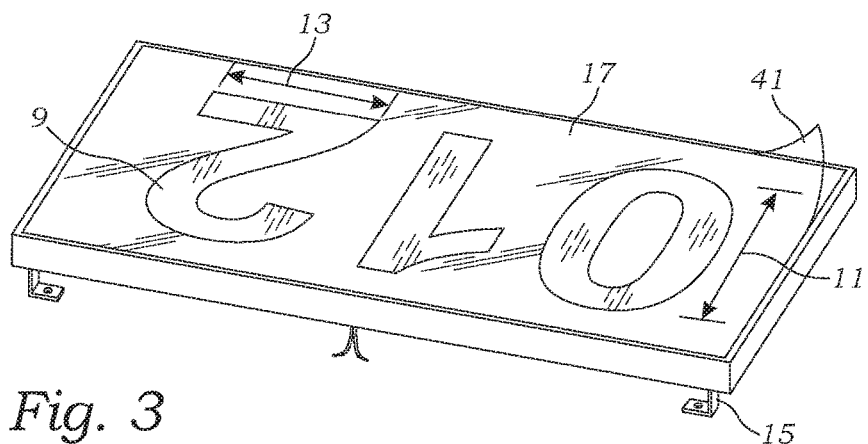
FIG. 3 is a top view of a frame possessing luminescent panels of the present invention.

As illustrated in FIGS. 2-10, the luminescent planar sheet may be constructed in various manners. As illustrated in FIGS. 2 and 3, in a first embodiment, the luminescent planar sheet comprises a light pipe 17 and an independent light source in the form of fluorescent bulbs. The light pipe may be made to create opaque alpha-numeric characters with luminescent borders around the alpha-numeric characters.

Figure 4:
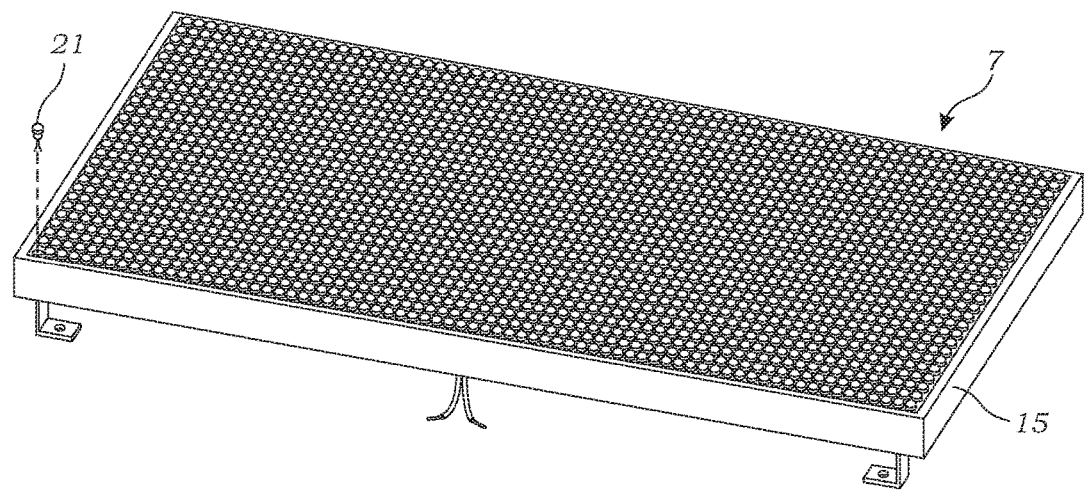
FIG. 4 is a top view of a frame possessing luminescent panels of the present invention possessing LED's.
Figure 5:
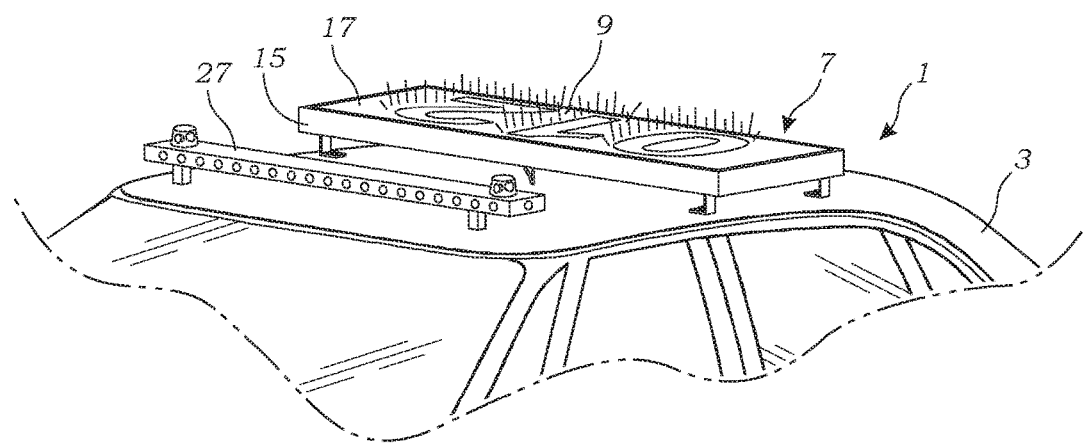
FIG. 5 is a front perspective view of the present invention.
Figure 6:
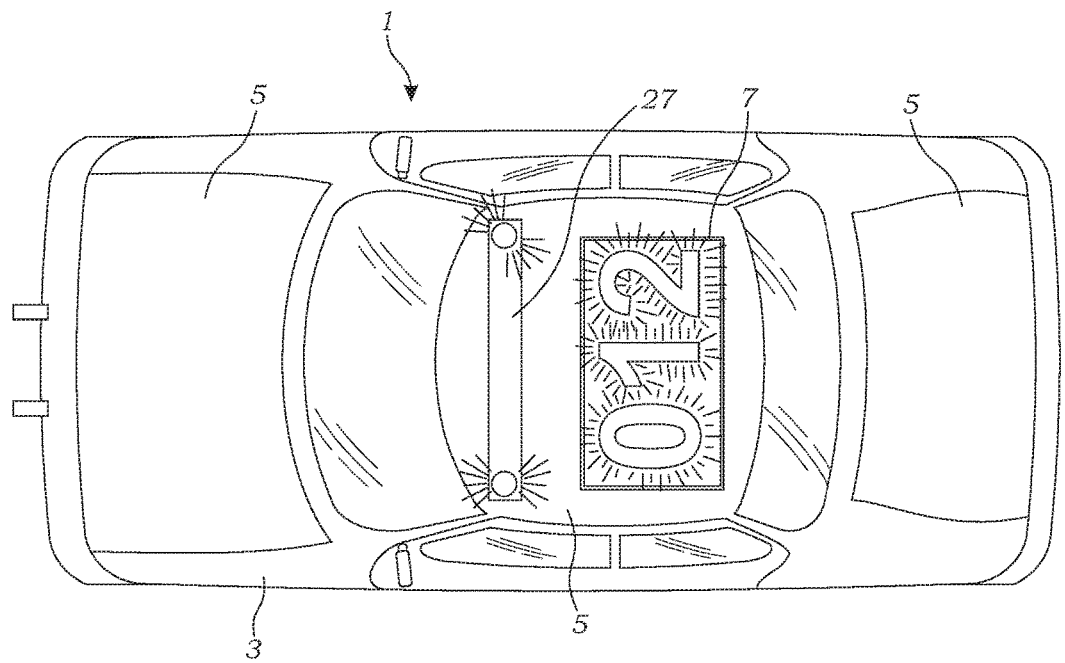
FIG. 6 is a top elevation view of the present invention.
Figure 7:
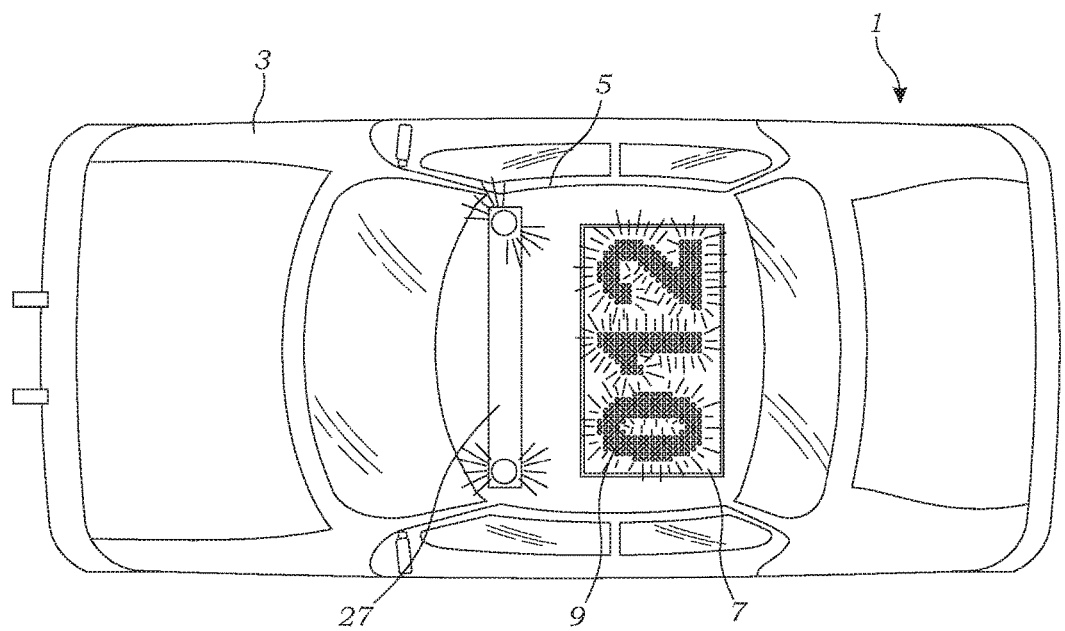
FIG. 7 is a top elevation view of an alternative embodiment of the present invention.

Alternatively, the luminescent planar sheet may be made to create luminescent alpha-numeric characters and an opaque border so as to identify such characters. As illustrated in FIGS. 4 and 5, the luminescent planar sheet may comprise a plurality of LEDs forming the light source which is again covered by a light pipe 17. Again, as illustrated in FIGS. 6 and 7, the indicia may be made to illuminate with an opaque border. Alternatively, the illuminated planar sheet may be made to have opaque indicia with an illuminated border. Where LEDs are employed, the switches controlling activation of the LEDs may be controlled by a computer processor as to form different indicia as desired.

Figure 8:
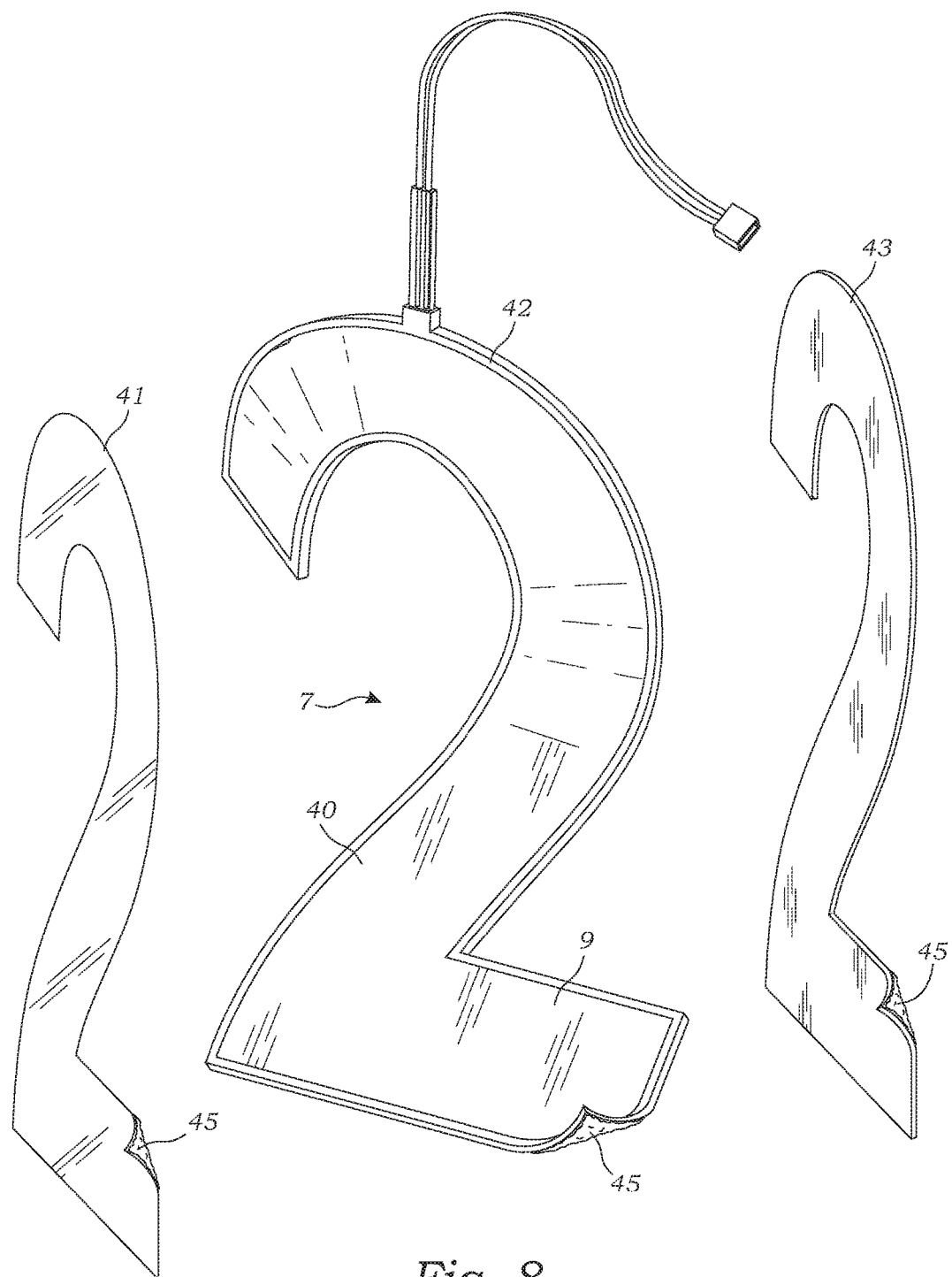
FIG. 8 is a perspective view of illuminated indicia in the form of an electroluminescent panel.
Figure 9:
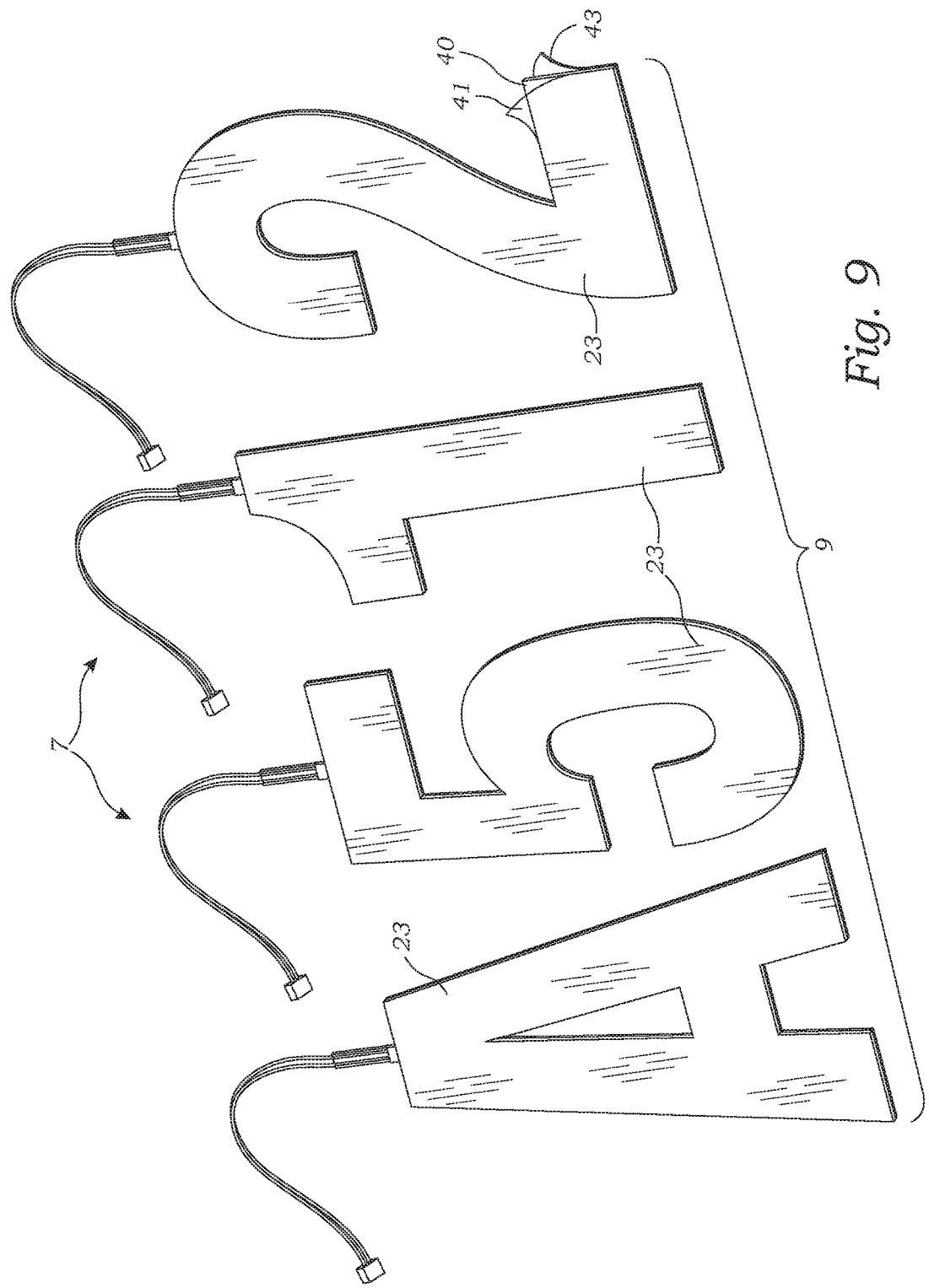
FIG. 9 is a perspective view of illuminated indicia in the form of four electro-luminescent panels for identifying an emergency response vehicle.
Figure 10:
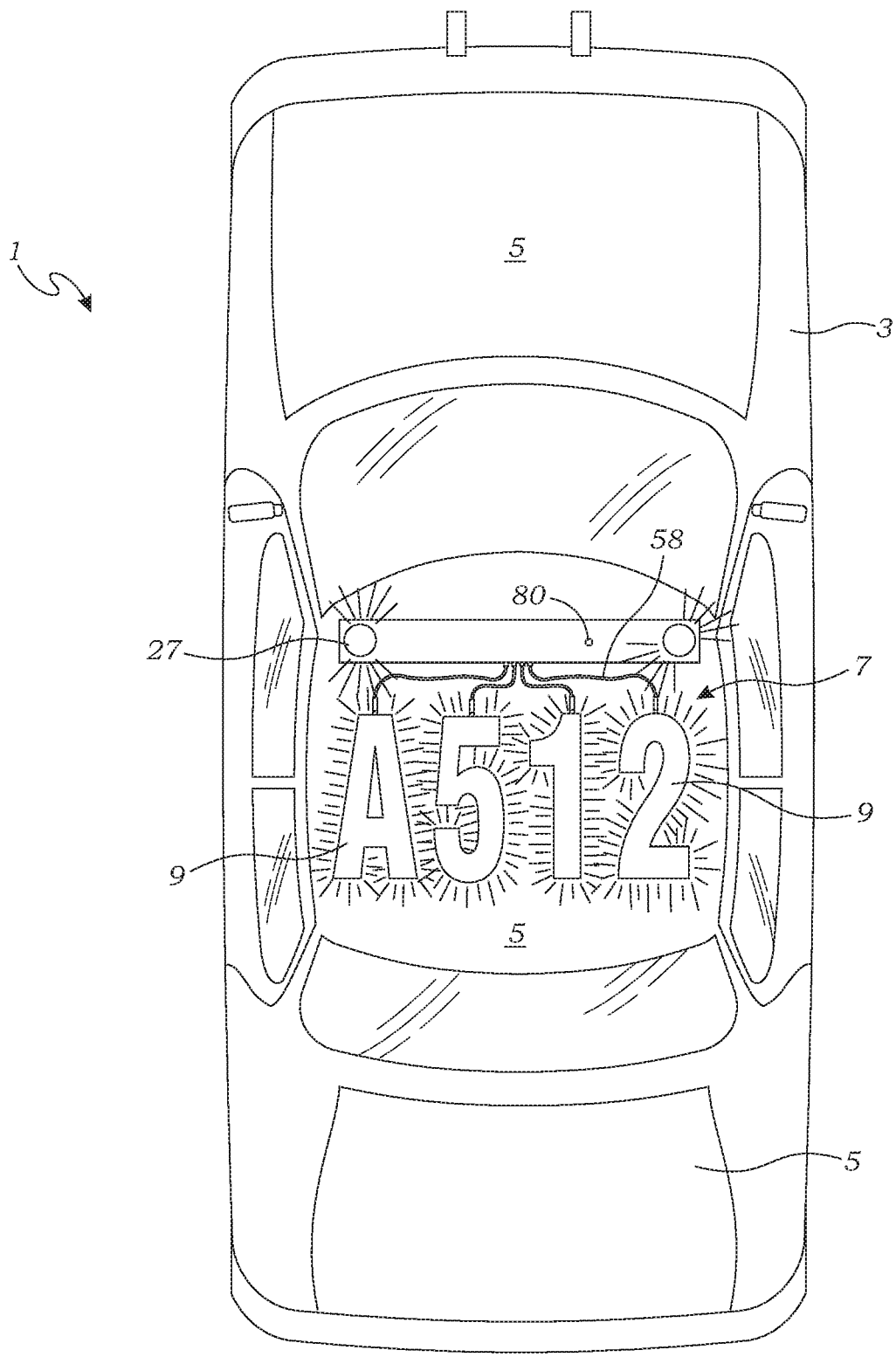
FIG. 10 is a top plan view of illuminated indicia in the form of four electroluminescent panels for identifying an emergency response vehicle.
Figure 11:
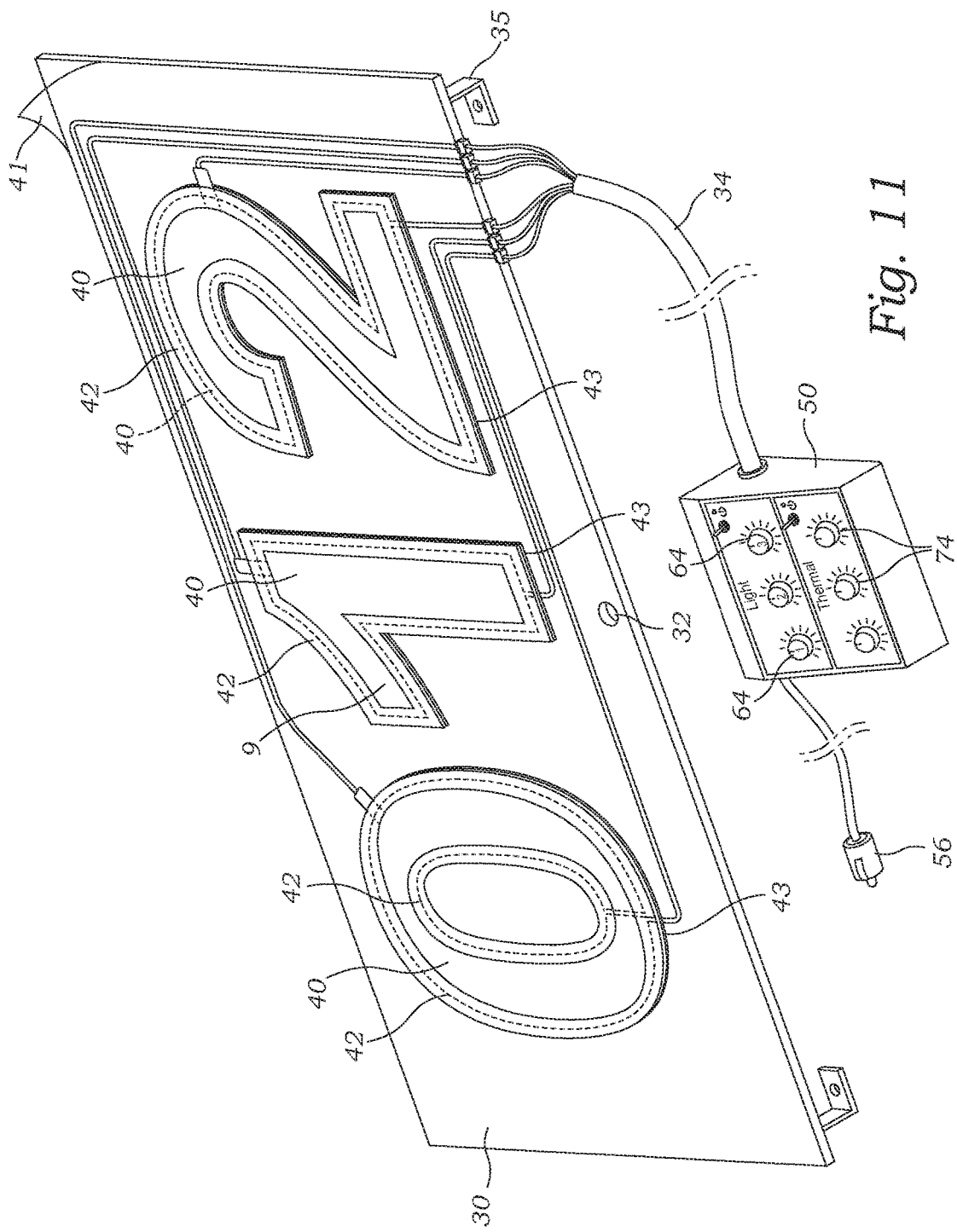
FIG. 11 is a top perspective view of illuminated indicia in the form of three luminescent panels connected to a controller for activating and controlling the amount of wattage provided to electroluminescent indicia and for activating and controlling the amount of wattage provided to infrared/thermal indicia.
Figure 12:
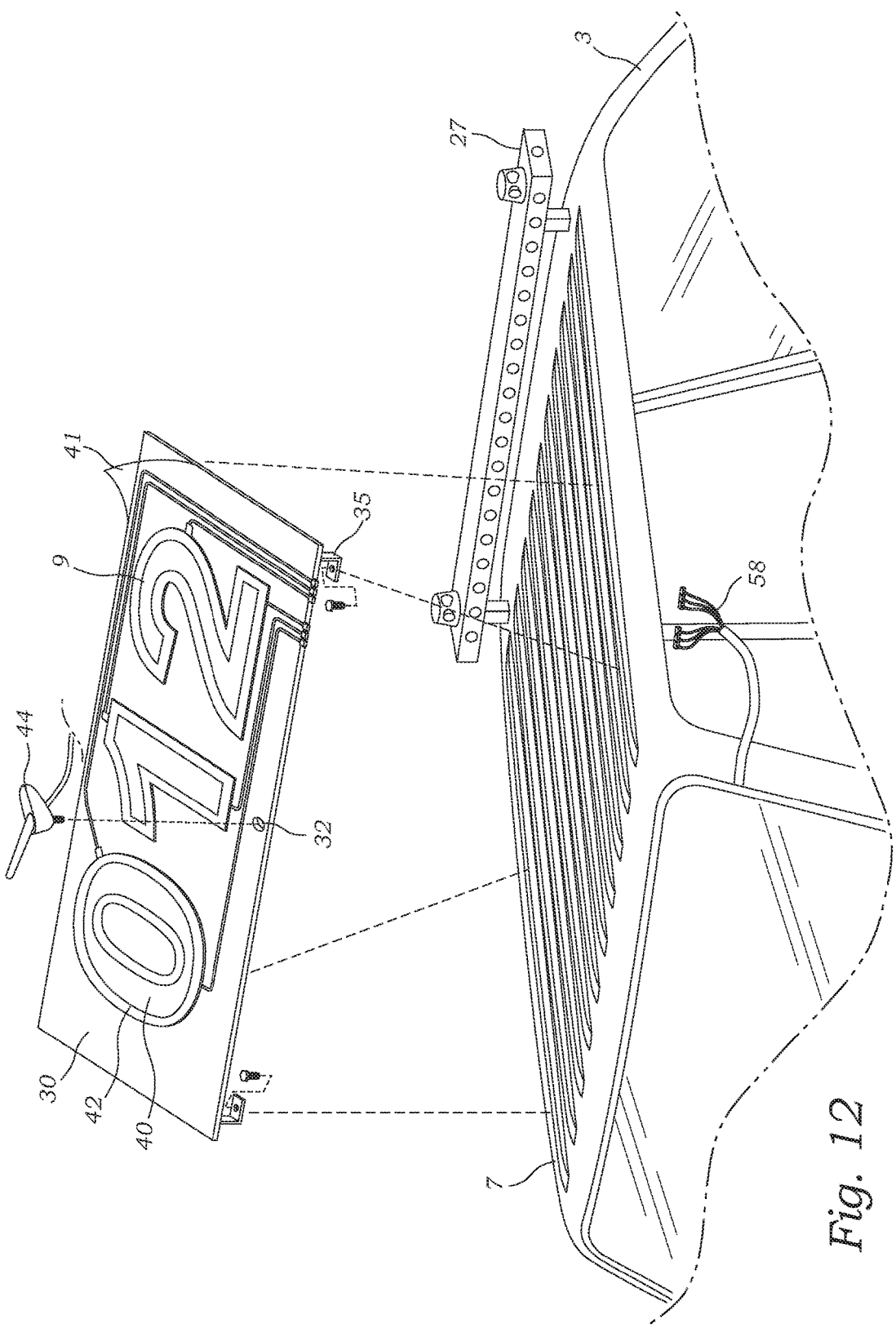
FIG. 12 is a perspective view of illuminated indicia in the form of three luminescent panels and a radio frequency antennae affixed to a planar plate constructed to be mounted upon the corrugated roof of a vehicle.
Figure 13:
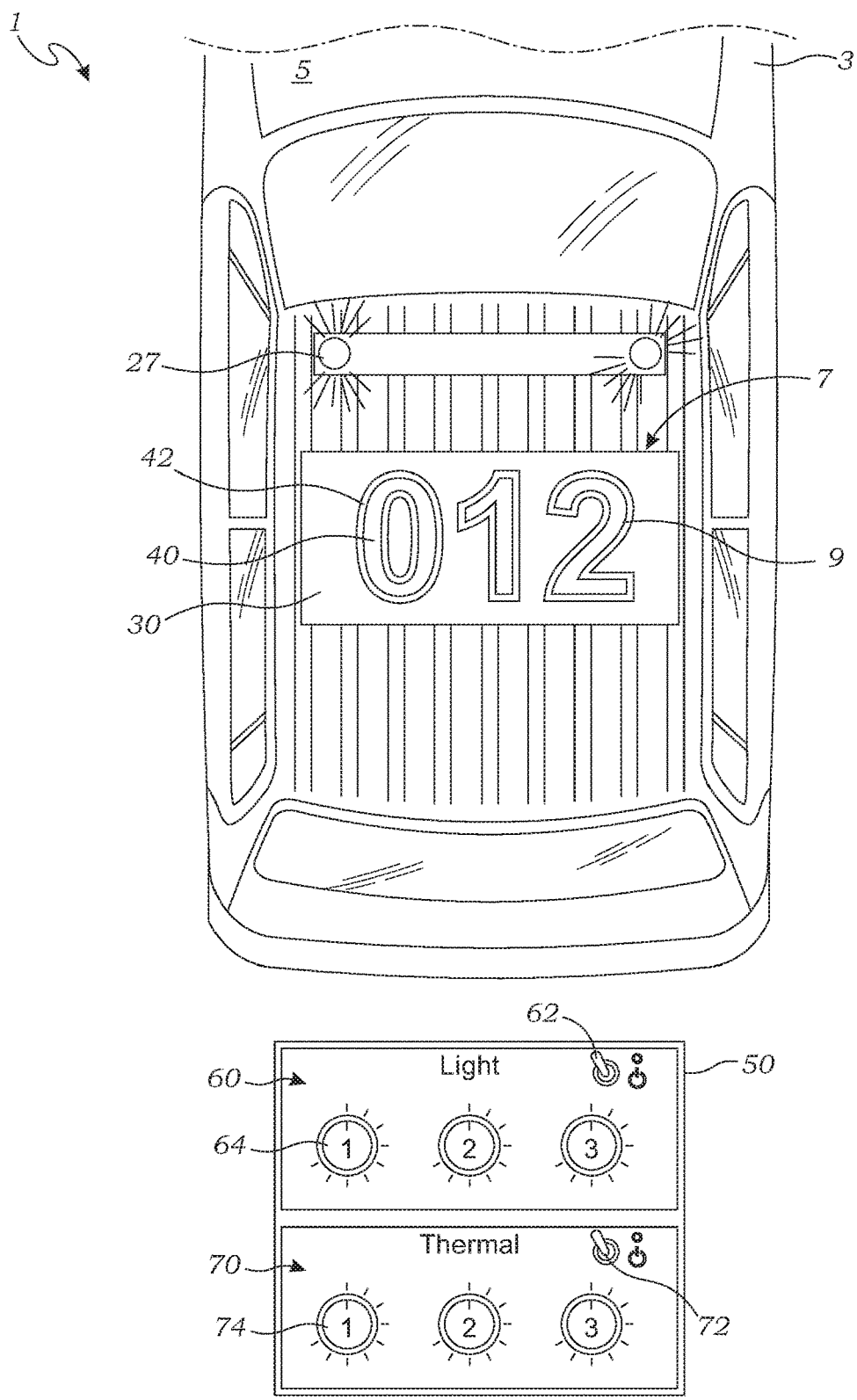
FIG. 13 is a top plan view of illuminated indicia in the form of three luminescent panels affixed to a planar plate which in-turn is mounted upon the corrugated roof of a vehicle, and illustrating a controller for activating and controlling the amount of wattage provided to electroluminescent indicia and for activating and controlling the amount of wattage provided to infrared/thermal indicia.
Figure 15:
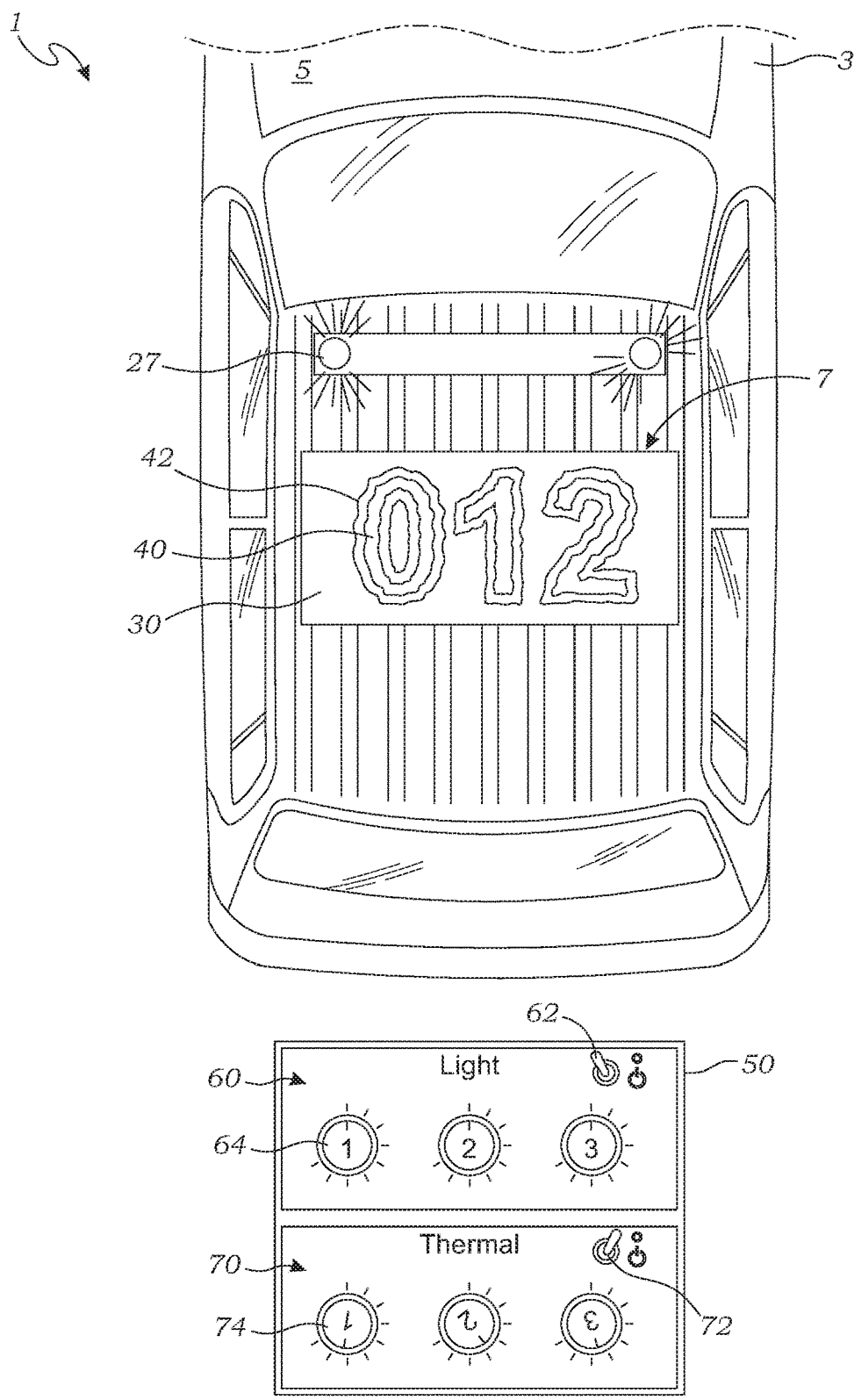
FIG. 15 is a top plan view of the luminescent panels, planar plate, vehicle, and controller of FIG. 13 wherein the controller has activated and adjusted the wattage provided to the infrared/thermal indicia.
Figure 17:
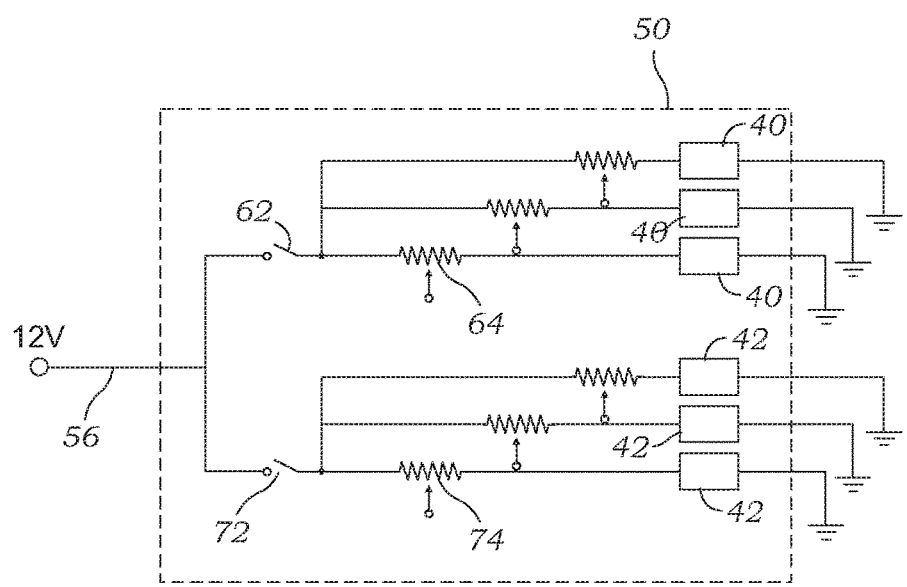
FIG. 17 is a simplified electrical diagram illustrating the switching system including 20 adjustable variable resistors to adjust the wattage provided to each infrared/thermal indicia and to each electroluminescent indicia.
Figure 20:
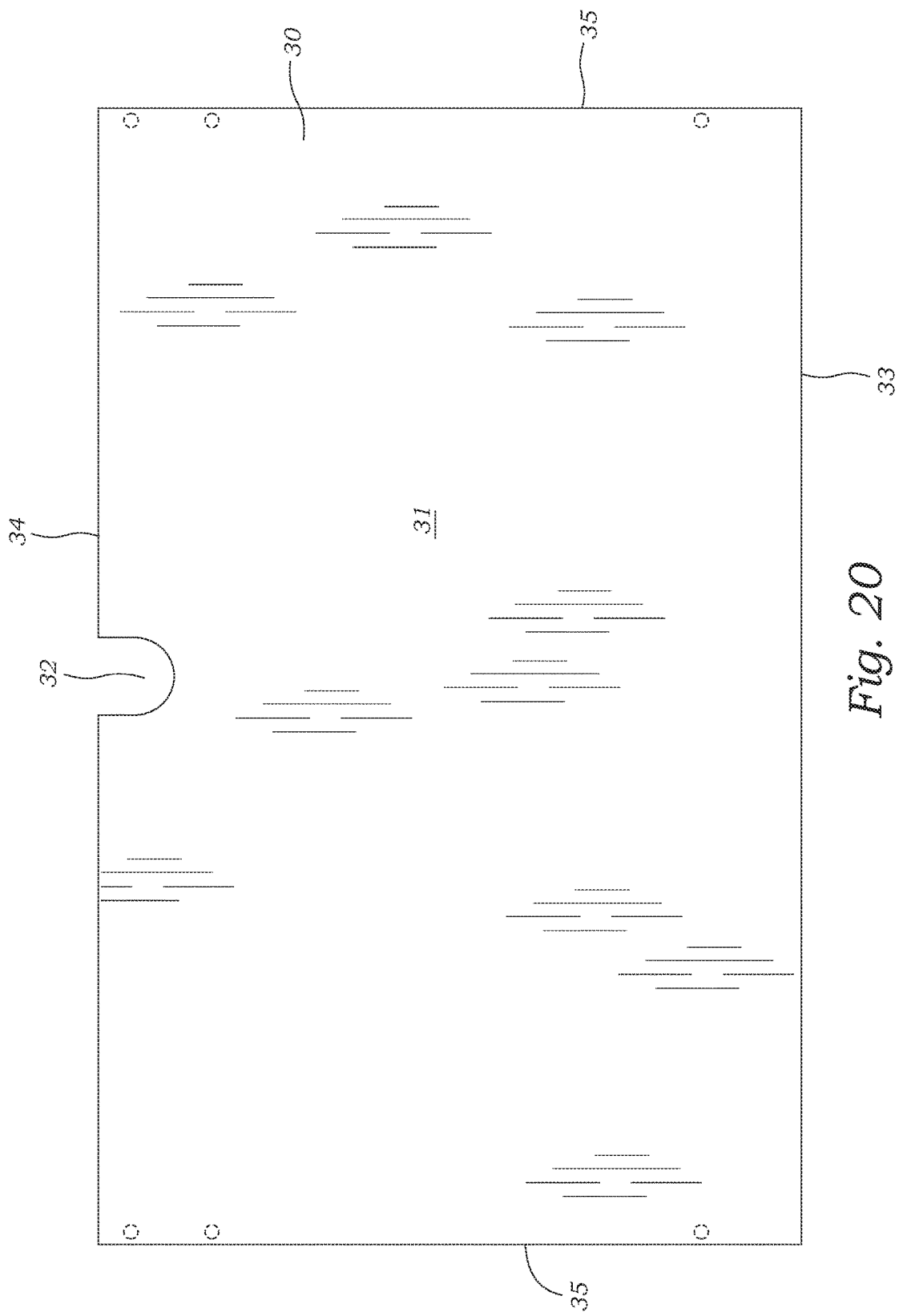
FIG. 20 is a top plan view of the second embodiment of the vehicle roof plate.
Figure 21:
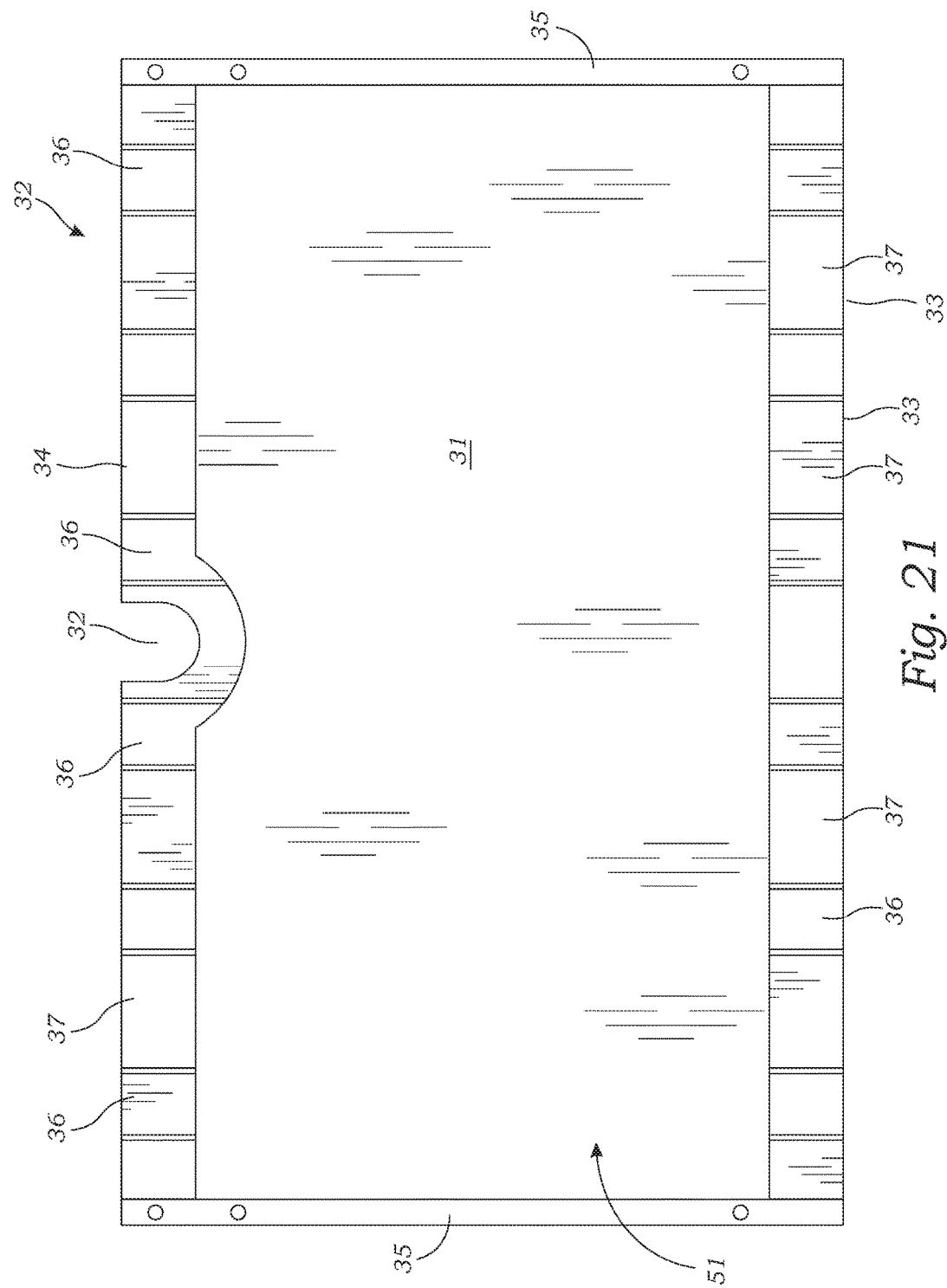
FIG. 21 is a bottom plan view of the second embodiment of the vehicle roof plate.
Figure 22:
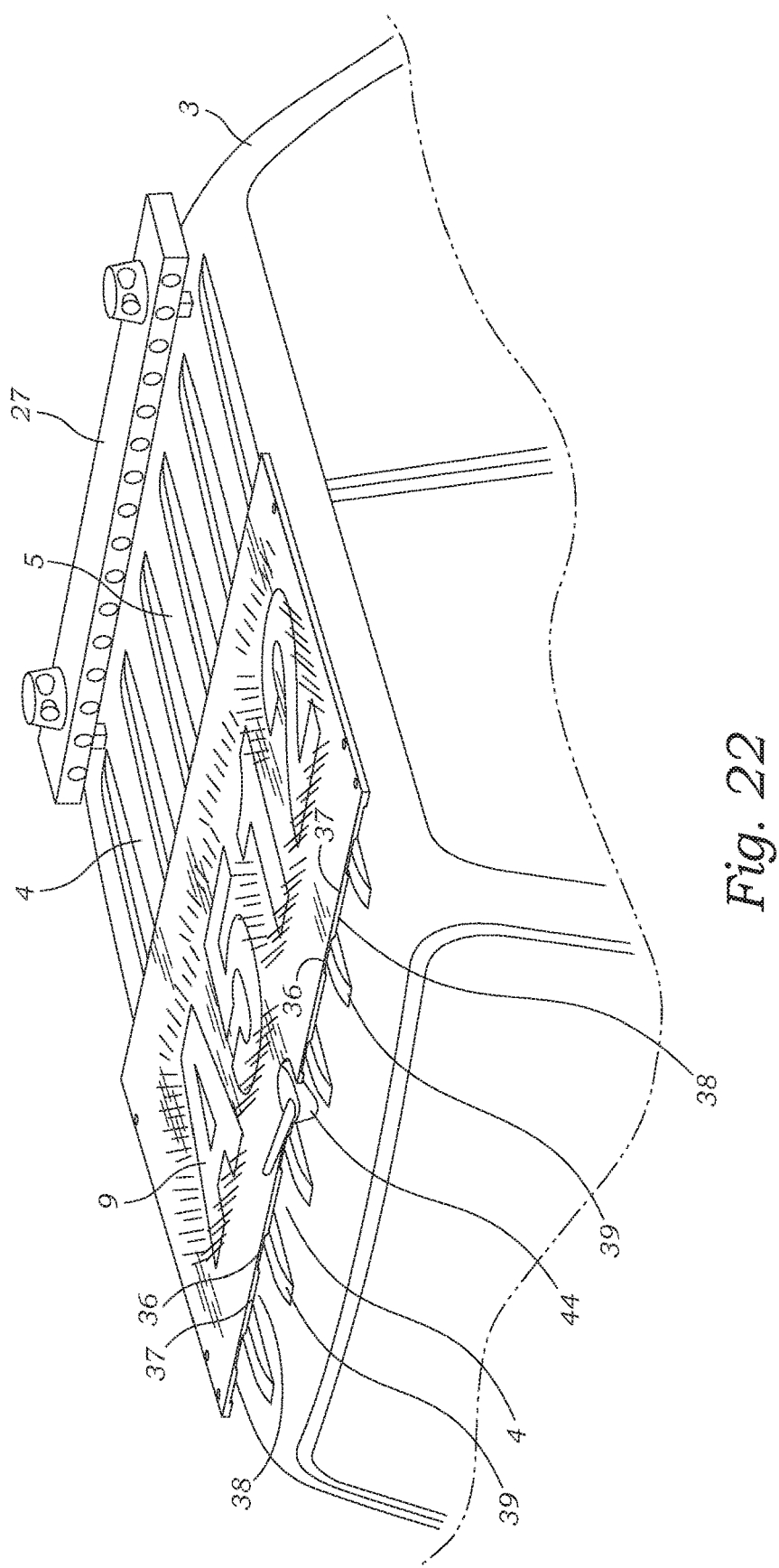
FIG. 22 is a top perspective view illustrating the second embodiment of the vehicular roof plate supporting emergency response vehicle identification characters and affixed to the corrugated roof of a vehicle.
Figure 25:
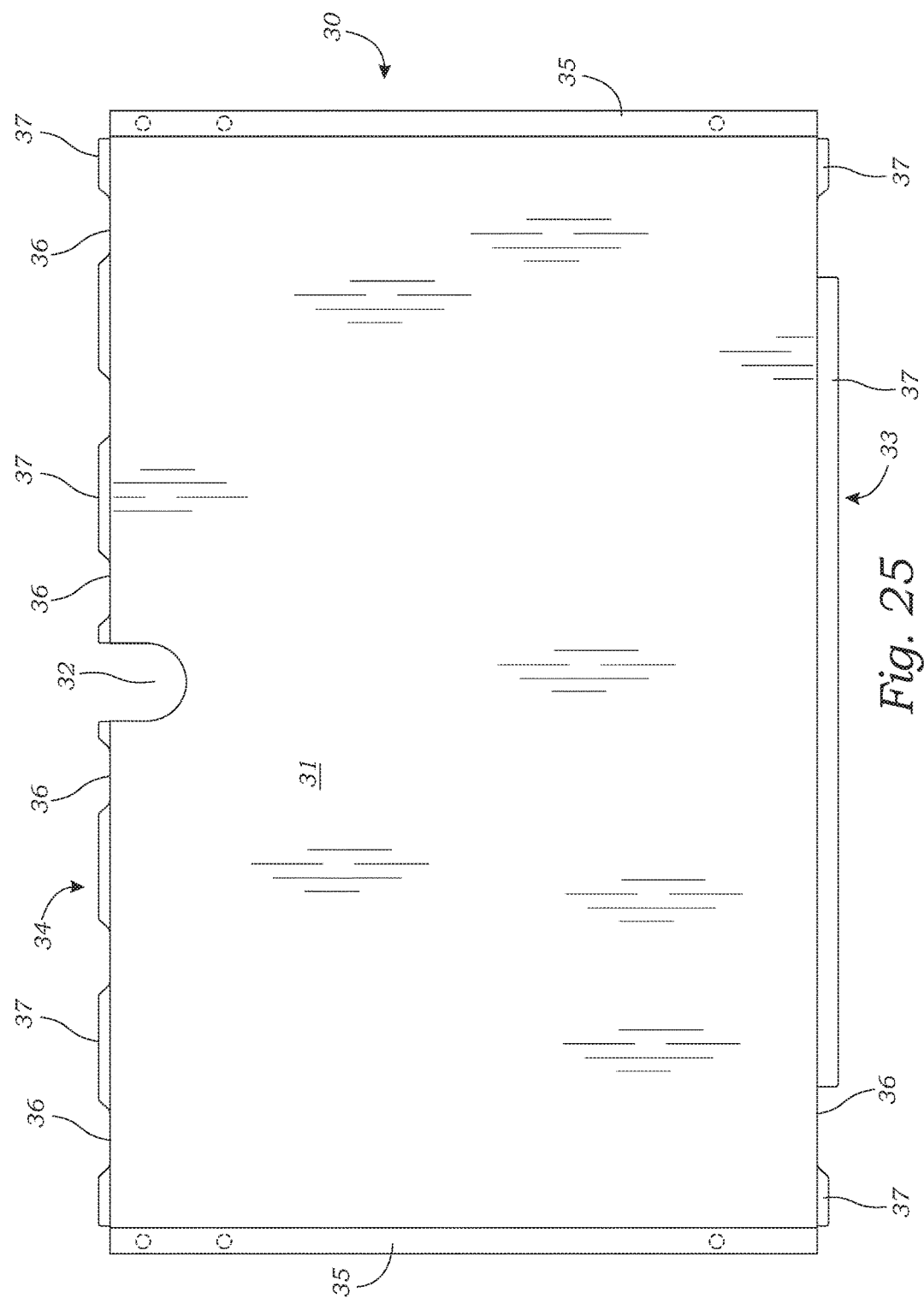
FIG. 25 is a top plan view of the third embodiment of the vehicle roof plate.
Figure 26:
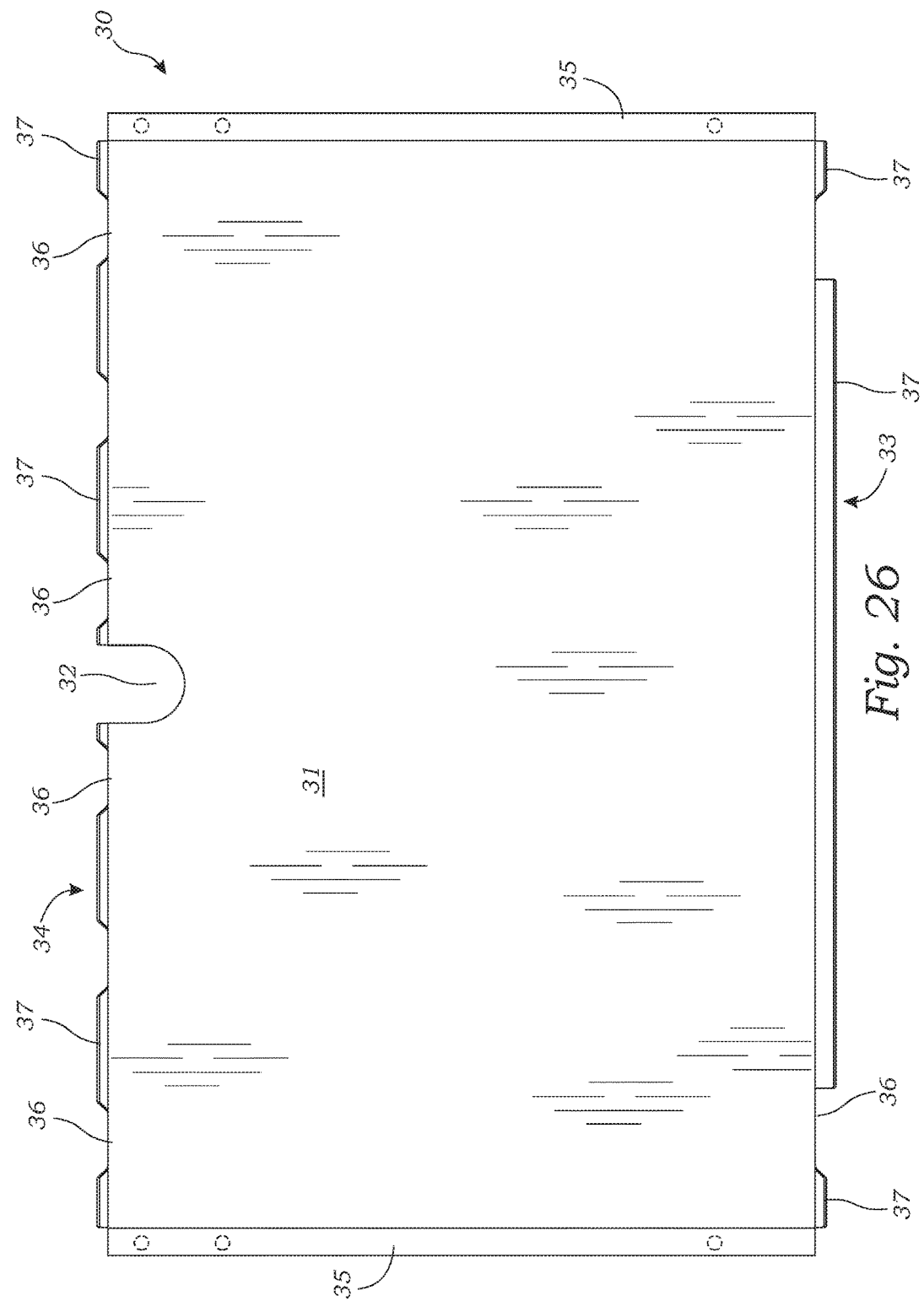
FIG. 26 is a bottom plan view of the third embodiment of the vehicle roof plate.
Figure 27:
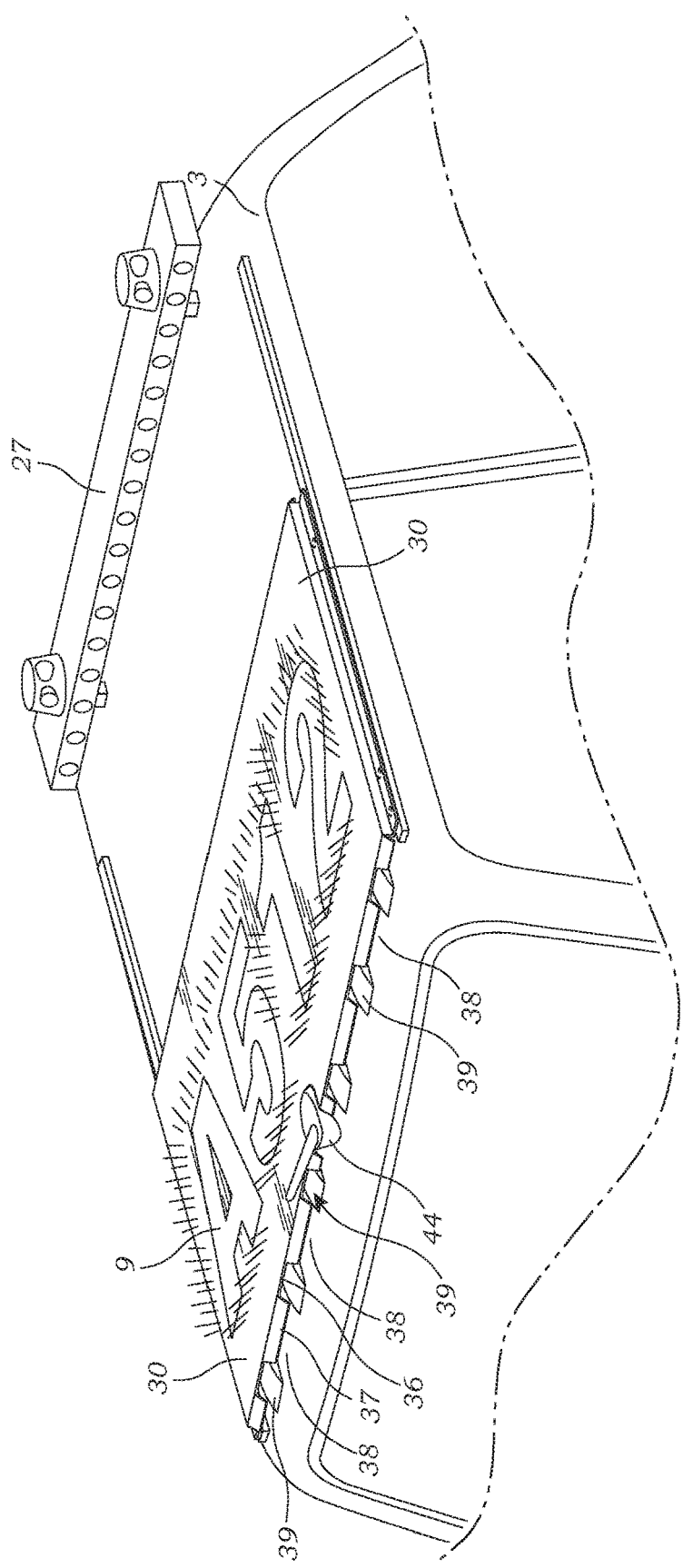
FIG. 27 is a top perspective view illustrating the third embodiment of the vehicular roof plate affixed to the corrugated roof of a vehicle and supporting emergency response vehicle identification characters.

In still an additional embodiment illustrated in FIGS. 8-10, the luminescent planar sheet 7 is constructed in the form of one or more electroluminescent (EL) panel lamps. The electroluminescent panels may be constructed in various forms such as described in U.S. Pat. No. 5,045,755. Alternatively, the electroluminescent panels may be constructed of organic light emitting diodes or devices (OLED), transparent organic light emitting devices (TOLED), or flexible organic light emitting devices (FOLED).

Advantageously, where the luminescent planar sheet 7 is constructed in the form of an EL panel 9, the EL panel can be adhered directly to one of the vehicle's horizontal planar surface 5. Conversely, where the luminescent planar sheet 7 is constructed to include LEDs or light bulbs 21, the luminescent planar sheet 7 will typically require a frame 15 for holding the light source, as illustrated in FIGS. 2-5. As illustrated in FIG. 10, preferably any wires 58 for supplying power to the luminescent planar sheet can be routed to a vehicle's existing light bar 27.

Figure 28:
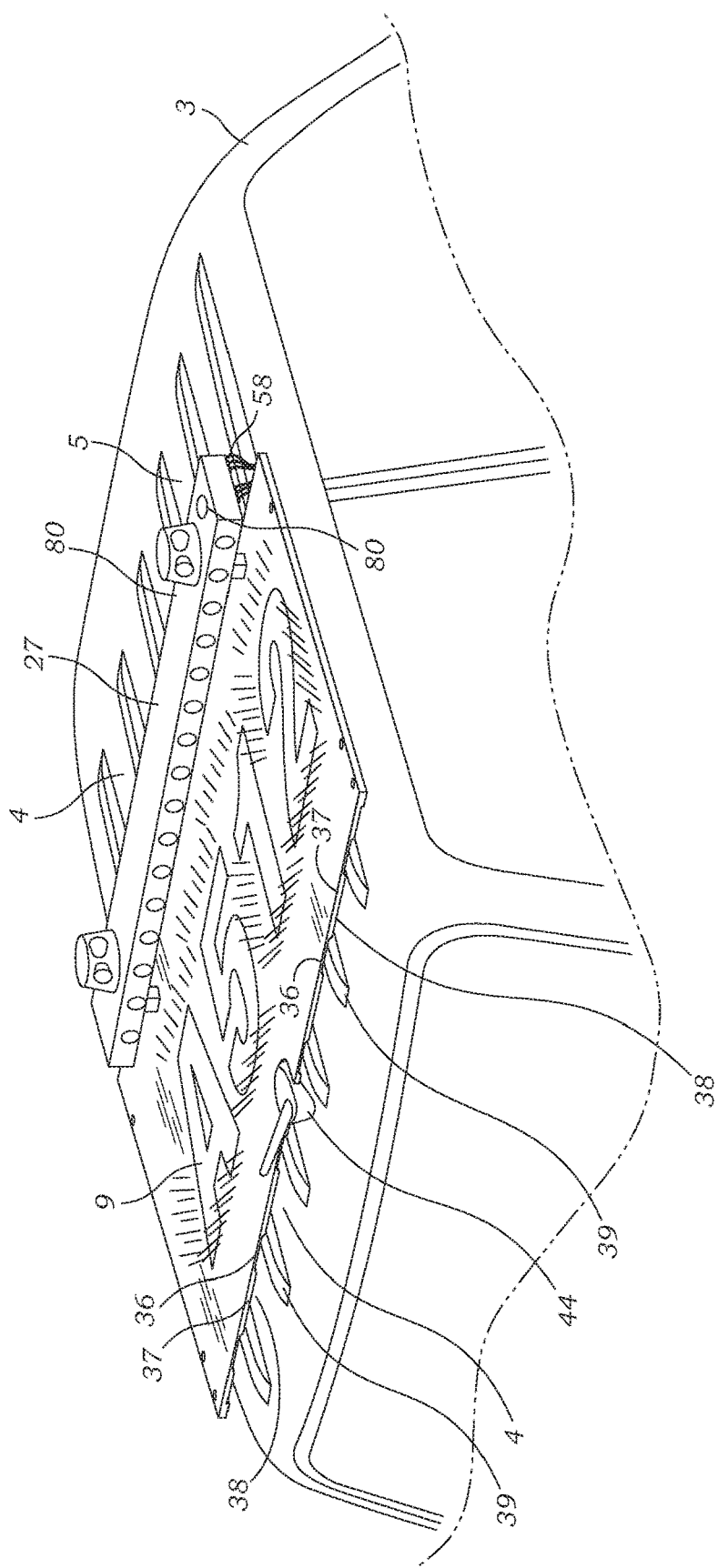
FIG. 28 is a top perspective view illustrating the second embodiment of the vehicular roof plate affixed to the corrugated roof of a vehicle and supporting emergency response vehicle identification characters and a light bar.

In a preferred embodiment, the lighting system may include a light sensor for automatically disabling the luminescent planar sheets when daylight, or other ambient lighting, is sufficiently strong so as to make the light produced by the luminescent indicia unnecessary. The light sensor may be a simple photocell, such as photo-resistor, in series with the wiring which connects the power source to the luminescent indicia. The light sensor automatically opens the electrical circuit, or variably increases the electrical resistance, to inhibit the supply of power to the luminescent indicia. The light sensor (photocell) may be located anywhere on the vehicle. However, as illustrated in FIGS. 10 and 28, in a preferred embodiment, the light sensor 80 is mounted on or otherwise incorporated into the vehicle light bar. Advantageously, the light sensor 80 will prevent the unnecessary use of the luminescent planar sheets during daylight which would unnecessarily utilize battery power and shorten the life of the light source(s).

As illustrated in FIGS. 11-17, in the currently preferred construction of the vehicular lighting system, each luminescent indicia 9 is constructed to include a central electroluminescent portion 40 powered by a first electrical circuit and a thermal/infrared portion 42 powered by a second electrical circuit. Preferably, the thermal/infrared portion is simply a highly resistant material, such as a silver or copper alloy, in the form of the indicia. As illustrated, the silver material 42 may be printed to form an elongate circuit upon the substrate material adjacent to the illuminated portion of the electroluminescent portion 40. In operation, a voltage is applied to the resistant material 42 causing the thermal/infrared portion to be heated to form thermal/infrared indicia.

With reference to FIGS. 8 and 9, where the infrared indicia is produced by heat, it is preferred that the planar luminescent sheet 7 include an insulator layer 43 positioned under the electroluminescent 40 and infrared 42 producing layer so as to prevent heat from dissipating into the vehicle's metal surface. In a preferred embodiment, the insulator layer 43 includes a pre-applied adhesive 45 for applying the planar luminescent sheet(s) 7 to a vehicle. Preferably, the adhesive 45 is covered by a peel away sheet (not shown) which can be easily peeled away by the installer when applying the planar luminescent sheet to a vehicle. Meanwhile, in a preferred embodiment, the bottom surface of the electroluminescent 40 and infrared 42 producing layer includes an adhesive for affixing to the top surface of the insulator layer 43.

In preferred embodiments, the insulator layer 43 has a thickness of at least 0.075 mm, a thermal conductivity of 0.25 W/m-K or less, and a thermal resistance "R-value" of 0.00050 m$^2$K/W or greater, and wherein "mm" refers to millimeters, "m" refers to meters, "W" refers to watts, and "K" refers to Kelvin. More preferably, the insulator layer 45 has a thickness of at least 0.080 mm and a thermal conductivity of 0.20 W/m-K or less. In still an additional preferred embodiment, the insulator layer 43 incorporates an adhesive 45 for affixing the insulator layer to an object such as a vehicle's planar surface. Preferably, this insulator 43 with adhesive 45 has thickness of at least 0.100 mm and a thermal conductivity of 0.18 W/m-K or less. A preferred insulator material that complies with these requirements is sold by 3M Company under their part number IJ35 which, with adhesive, has a thickness of 0.102 mm, an approximate thermal conductivity of 0.18 W/m-K, and an approximate thermal resistance R-value of 0.00055 m$^2$K/W as tested in accordance with ASTM E1530 Rev. 11.

A preferred illuminated vehicle sign of the present invention utilizes electroluminescent indicia 40 operating at 14.4 volts and 800 Hz. To provide these power characteristics, preferably an inverter (not shown) converts the vehicle's DC 12 volts to a nominal 14.4 volts and 800 Hz. However, alphanumeric characters of the same font size have different surface areas. For example, preferred electroluminescent numbers having the same 20 inch height have the following respective surface areas:

| Number | Square Inches |
| --- | --- |
| 0 | 117 |
| 1 | 68 |
| 2 | 110 |
| 3 | 98 |
| 4 | 107 |
| 5 | 113 |
| 6 | 110 |
| 7 | 78 |
| 8 | 121 |
| 9 | 110 |

It has been discovered that providing each of the numerals with the same wattage results in some numbers being brighter than others. Similarly, if the same wattage is provided to each thermal/infrared portion of the luminescent indicia, this will result in some indicia having a much greater temperature than other indicia or will result in alphanumeric characters with lesser surface areas "burning" out quicker than others. Moreover, it is common to substitute the alphanumeric characters atop emergency response vehicles.

To overcome these problems, as illustrated in FIGS. 11-17, the switching system 50 of the present invention includes adjustable variable resistors 64 and 74 which adjust the current, and accordingly, the wattage provided to the electroluminescent portion and/or thermal/infrared portion of the indicia to provide uniform luminescence. In one embodiment of the invention, the adjustable variable resistors 64 and 74 are controlled automatically based upon automated determinations of the size of each indicia. To this end, preferably the switching system includes one or more resistance, current, voltage, or wattage sensors for measuring the resistance, current, voltage or wattage of the electroluminescent portion and/or thermal/infrared portion of the luminescent planar sheets, and includes a controller for automatically adjusting the resistance of the adjustable variable resistors 64 and 74 based upon measurements made by these sensors. The circuitry for providing this automatic adjustment of the adjustable variable resistors 64 and 74 can be determined by those skilled in the art without undue experimentation.

In an alternative embodiment of the invention illustrated in FIGS. 11-17, the switching system 50 includes manually controlled variable resistors 64 and 74. Preferably, the switching system 50 includes on/off switches 62 and 72 for activating and deactivating either the electroluminescent portions and/or the thermal/infrared portions 42, and includes manually rotatable switches 64 and 74 for varying the resistance, and thus wattage provided to the electroluminescent portions and/or the thermal/infrared portions 42. Though illustrated in FIGS. 11-17 as in one control box, it is preferred that the on/off switches 62 and 72 be located within the vehicle cabin so as to be easily accessible to emergency response personnel, and it is preferred that the manually rotatable switches 64 and 74 be located so as to be accessible only during installation of vehicular illuminated sign 1 so as to not be inadvertently altered after installation.

In still an additional embodiment, the luminescent panels include one or more resistors (not shown) located within each of the luminescent panels to provide uniform electrical characteristics across the spectrum of different alphanumeric characters. More specifically, for this embodiment, the luminescent indicia are constructed to include resistors electrically connected to the electroluminescent circuitry and/or the thermal/infrared circuitry so that alphanumeric characters of different surface areas can be swapped but still provide uniform luminescence.

With reference to FIGS. 3, 8 and 9, preferably the top surfaces of the luminescent panels include a protective coating 41. Because the luminescent panels of the present invention preferably produce light in the visible light spectrum and/or infrared spectrum, it is preferred that the protective coating is substantially translucent within these spectrums of light. However, it is preferred that the protective coating blocks most or substantially all light in the ultraviolet (UV) light spectrum.

The protective coating 41 will provide protection against abrasion and various forms of environmental radiation. The protective coating may take various forms. For example, the protective coating may be incorporated in the manufacturing process utilizing a spray coating. However, a laminate application is preferred. Where the luminescent panel is an electroluminescent panel, it is preferred that the protective coating forms the upper layer of the electroluminescent panel and is preferably a flexible plastic. Moreover, it is preferred that the protective coating blocks at least 60% of ultraviolet light below 350 nanometers, and even more preferably blocks at least 90% of ultraviolet light below 350 nanometers. Conversely, it is preferred that the protective coating allow at least 80% transmission of visible infrared light above 450 nanometers, and even more preferably allow at least 85% of visible and infrared light above 500 nanometers. Furthermore, it is preferred that the protective coating have an adhesive 45 (seen in FIG. 8) formed on its bottom surface for applying the protective coating 41 to the top surface of the luminescent planar sheets 7. Acceptable protective coatings providing these characteristics include polyvinyl fluoride (PVF) films, polymethyl methacrylate films, Tedlar from Dupont, and Acrylar from 3M Company.

Still an additional preferred luminescent planar sheet 7 provides the greatest visibility in both the daytime and nighttime. Specifically, it has been found that particular embodiments described above are not easily seen during the daytime. For example, substantially white electroluminescent panels are difficult to read during the daytime when mounted upon on a white surface. In contrast, with reference to FIGS. 30-36, a preferred luminescent planar sheet 7 includes a printed circuit board 85. The printed circuit board has a substantially traditional construction including one or more layers of nonconducting substrates and electrically conducting pathways which are constructed to connect to surface mounted electronics. The printed circuit boards may be any size. However, preferred alphanumeric characters having a height of 16 inches, 20 inches or 24 inches will have correspondingly sized circuit boards having a length of at least 16 inches, 20 inches or 24 inches.

Of importance, the printed circuit board 85 has a top surface 87 which is of a color which contrasts with the mounting surface 6 upon which the luminescent planar sheet 7 is mounted. For example, it is common for police vehicles to be painted either black or white. Accordingly, wherein a luminescent planar sheet is intended to be mounted upon a police vehicle's white surface, the printed circuit board's top surface 87 is made to appear a dark color such as black. Conversely, when the police vehicle 3 has been painted black, the printed circuit board's top surface 87 will be white. Other contrasting colors would also be acceptable. For example, in preferred embodiments, the vehicle's mounting surface 6 is either white, yellow or light green and the printed circuit board's top surface 87 is either black, brown, red, blue or dark green. Conversely, in alternative embodiments, the vehicle's mounting surface 6 is a dark color such as black, brown, red, blue or dark green, but the printed circuit board's top surface 87 is white, yellow or light green.

For this embodiment and as best illustrated in FIGS. 30-32 and 35, the luminescent planar sheet 7 includes a plurality of LEDs 89 which are mounted to the printed circuit board's top surface 87. The LEDs 89 can be of any shape or size as can be selected by those skilled in the art. However, it is preferred that the LEDs have minimal surface area so as to minimize the obstruction of the printed circuit board's top surface. Preferred LEDs include those commonly designated as SMD 5630, SMD 5050, SMD 3528 or SMD 2835.

Figure 35:
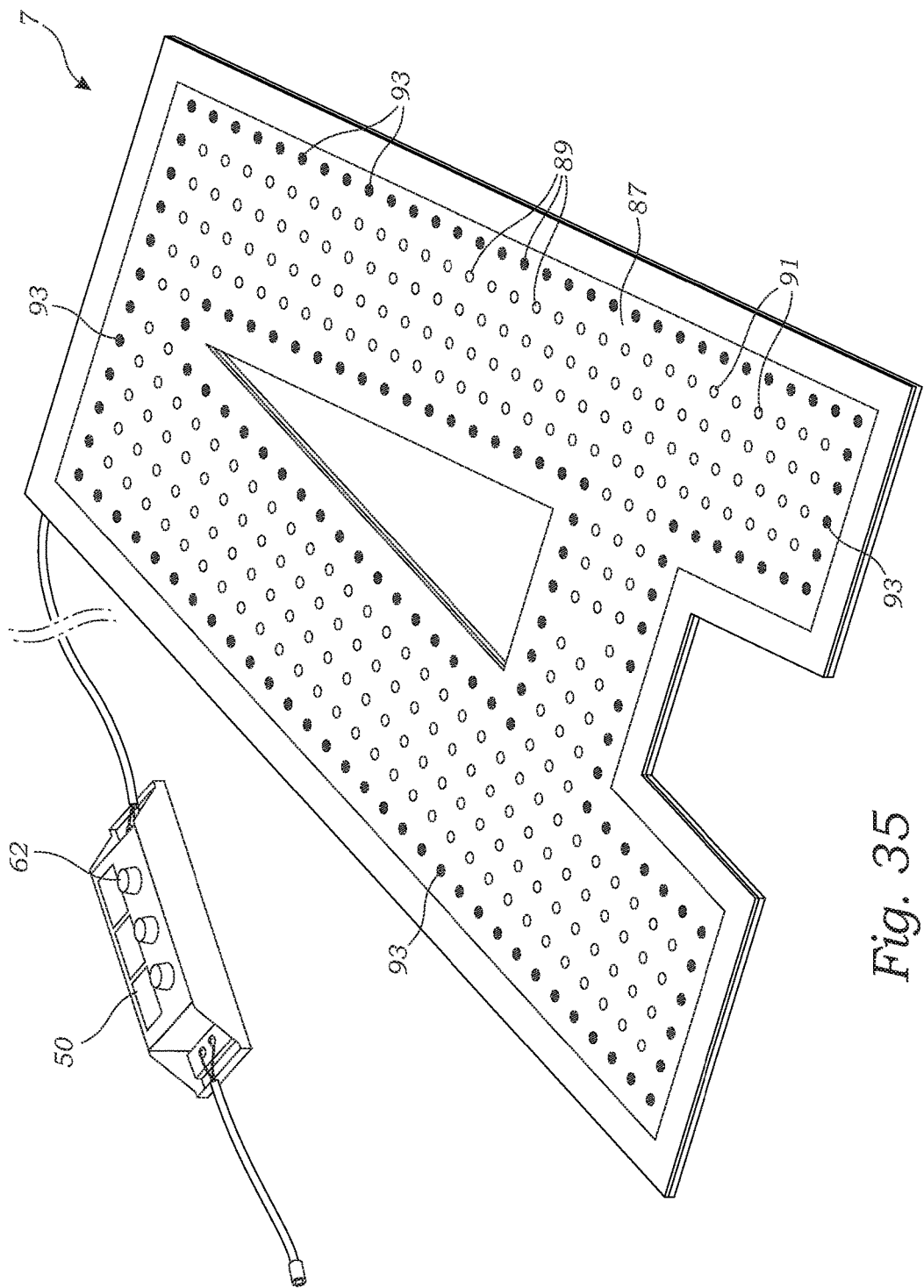
FIG. 35 is a top perspective view illustrating an additional embodiment of a preferred luminescent panel including a printed circuit board supporting surface mounted LEDs wherein the LEDs include LEDs that produce light at a peak wavelength visible to the human eye and the LEDs include LEDs that produce infrared light at a peak wavelength invisible to the human eye.

In the preferred embodiment illustrated in FIG. 35, the luminescent planar sheet 7 includes a plurality of SMD 2835 LEDs which are mounted substantially uniformly upon the printed circuit board's top surface 87. The LEDs may consist of SMD 2835 LEDs which produce light at a peak wavelength that is visible light to the human eye such as producing red, green or blue light in the visible spectrum. For example, red LEDs may be employed for fire fighting vehicles, and white LEDs may be employed by police vehicle for increased visibility or for increase ambient light in the vicinity of the vehicle. Alternatively, the LEDs may include SMDs 2835 LEDs which can selectively produce different colors such as RGB LEDs which can product green or white light in normal conditions, or produce red (or flashing red) in emergency conditions.

Figure 36:
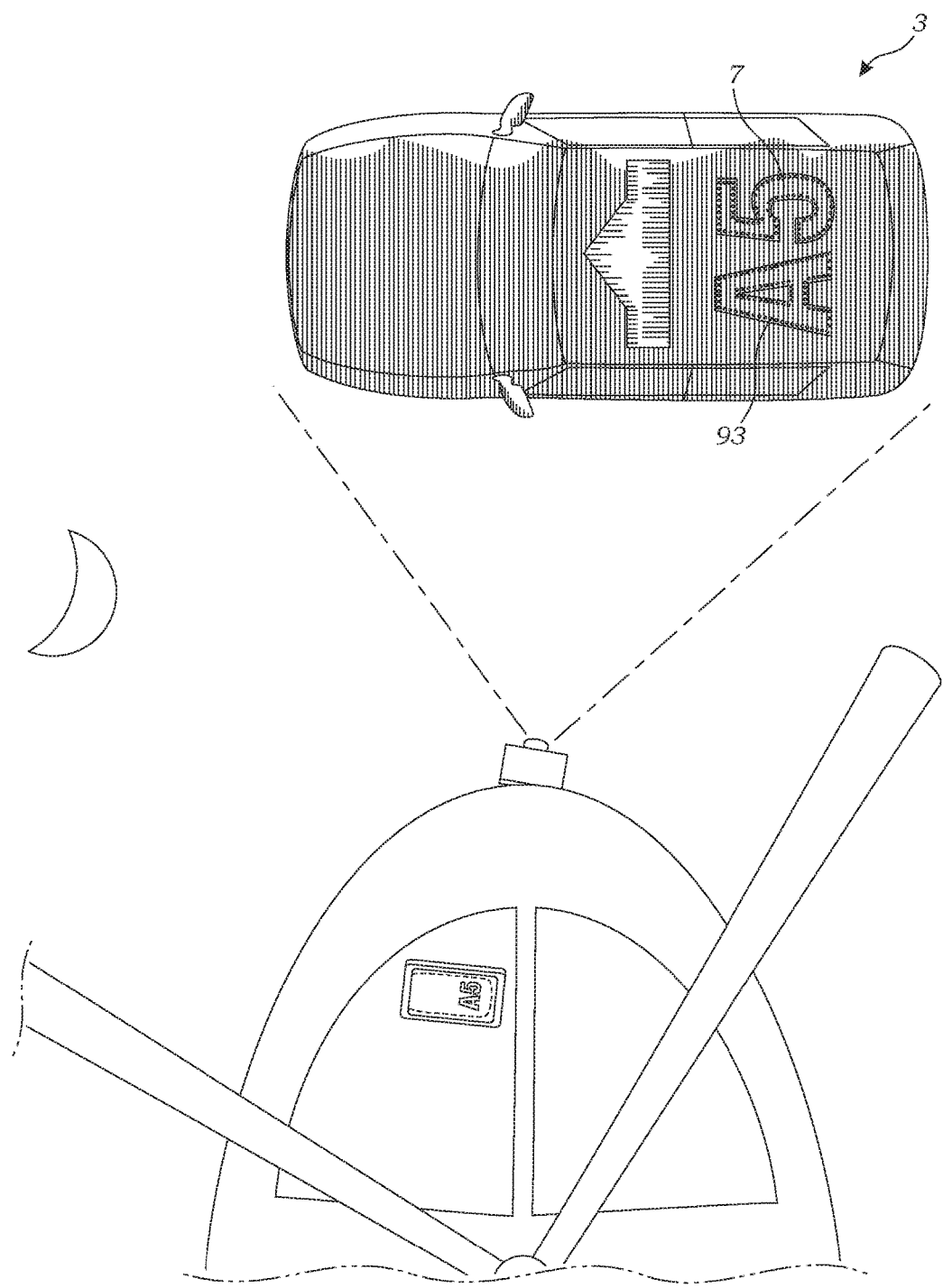
FIG. 36 is a top view illustrating the preferred luminescent panels shown in FIG. 35 illustrating their visibility by night vision equipment as seen within a helicopter.

In still alternative embodiments, preferred LEDs include infrared SMD 2835s which are constructed to produce infrared light that has a peak wavelength in the infrared spectrum that is not visible to the human eye. In a preferred embodiment illustrated in FIG. 35, the luminescent planar sheet includes a first set of LEDs 91 which produce light at a peak wavelength that is visible to the human eye, and a second set of LEDs 93 which produce light at a peak wavelength in the infrared spectrum that is not visible to the human eye. More preferred, the infrared LEDs produce infrared light at a peak wavelength above 800 nm. For example, for this embodiment, it is preferred the luminescent panels 7 include infrared LEDs 93 which produce light at a peak wavelength of about 850 nm when employed by police and security operations, or include infrared LEDs 93 which produce light at a peak wavelength of about 940 nm when used for military applications. As illustrated in FIGS. 35 and 36, the infrared LEDs 93 are preferably located substantially uniformly at the periphery of the luminescent planar sheets alphanumeric character so that upon illumination of the infrared LEDs, and illuminated infrared letter or number is produced. Meanwhile, it is preferred that the visible light LEDs 91 be uniformly positioned throughout the interior of the alphanumeric character.

To enable the alphanumeric character to be easily read during the daytime, the LEDs 91 and 93 cover as little of the printed circuit board's top surface 87 as possible. For example, in nonpreferred embodiments, the LEDs cover no more than twenty percent (20%) of the surface area of the printed board's top surface so that at least eighty percent (80%) of the printed circuit board's top surface is visible. In a more preferred embodiment, the LEDs cover no more than ten percent (10%) of the surface area of the printed circuit board, and in still a more preferred embodiment the LEDs cover no more than seven percent (7%) of the surface area of the printed circuit board. For example, preferred constructions for the letters "L" and "A", and the number "2" are presented below for alphanumeric characters which are twenty (20) inches tall (508 millimeters).

spectrum of light, and that the 472 LEDs include 111 infrared LEDs 93 located at the periphery of the letter "A". In the nonpreferred embodiment, utilizing SMD 5050 LEDs, which are 5.0 mm×5.0 mm for a total of 25.0 mm$^2$, results in the LEDs (91 and 93) having a total surface area of 11,800 mm$^2$, thus covering a total of 13.5% of the entire surface area of the printed circuit board. Conversely, in the preferred embodiment of the letter "A" utilizing the same number of visible SMD 2835 LEDs and same number of SMD 2835 infrared LEDs results in the LEDs having a total surface area of only 4,625.6 mm$^2$, resulting in only 5.3% of the printed circuit board's top surface 87 being covered by LEDs.

Figure 33:
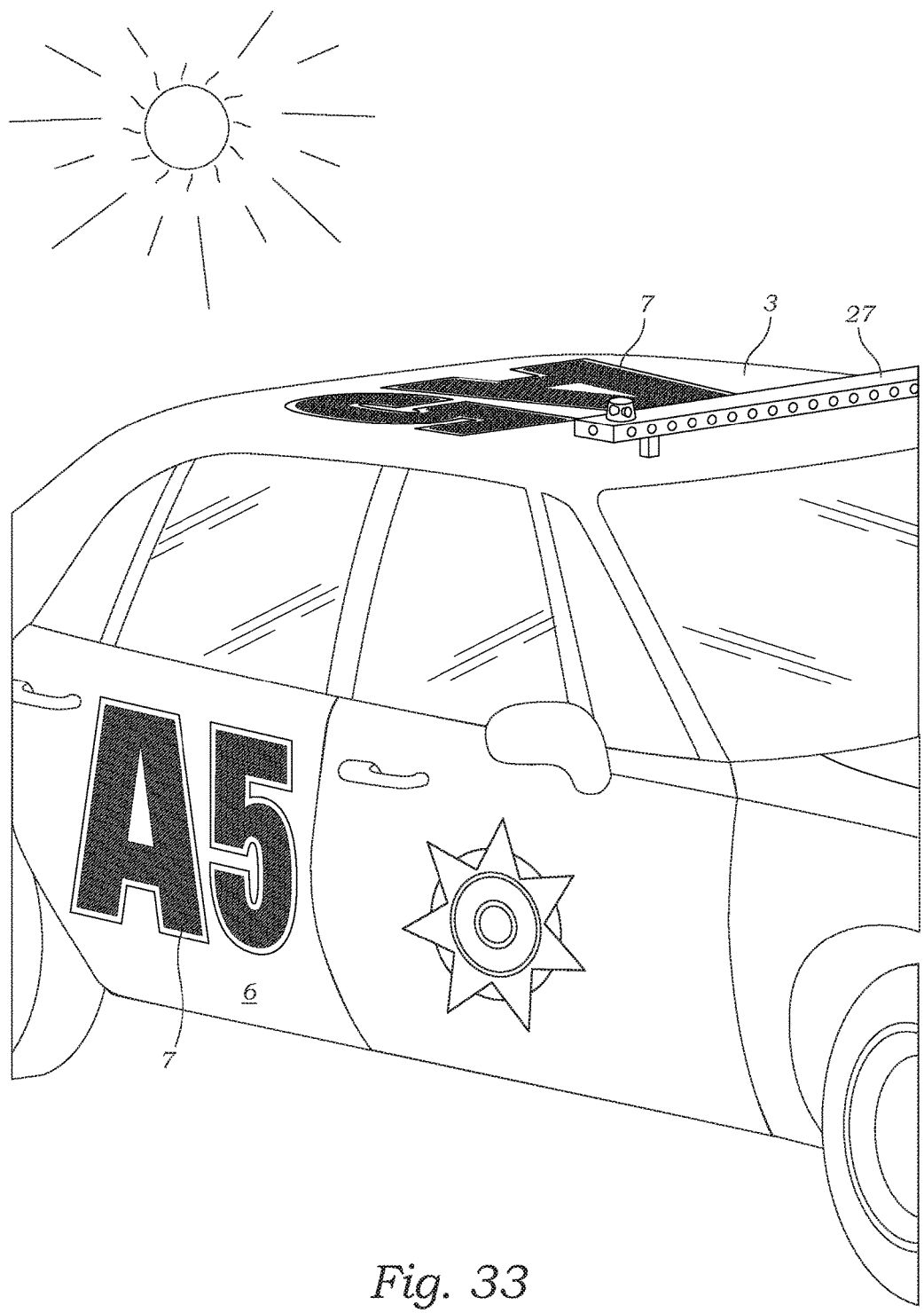
FIG. 33 is a perspective view illustrating the preferred luminescent panels of FIG. 30 mounted on an emergency response vehicle as seen during the daytime.
Figure 34:
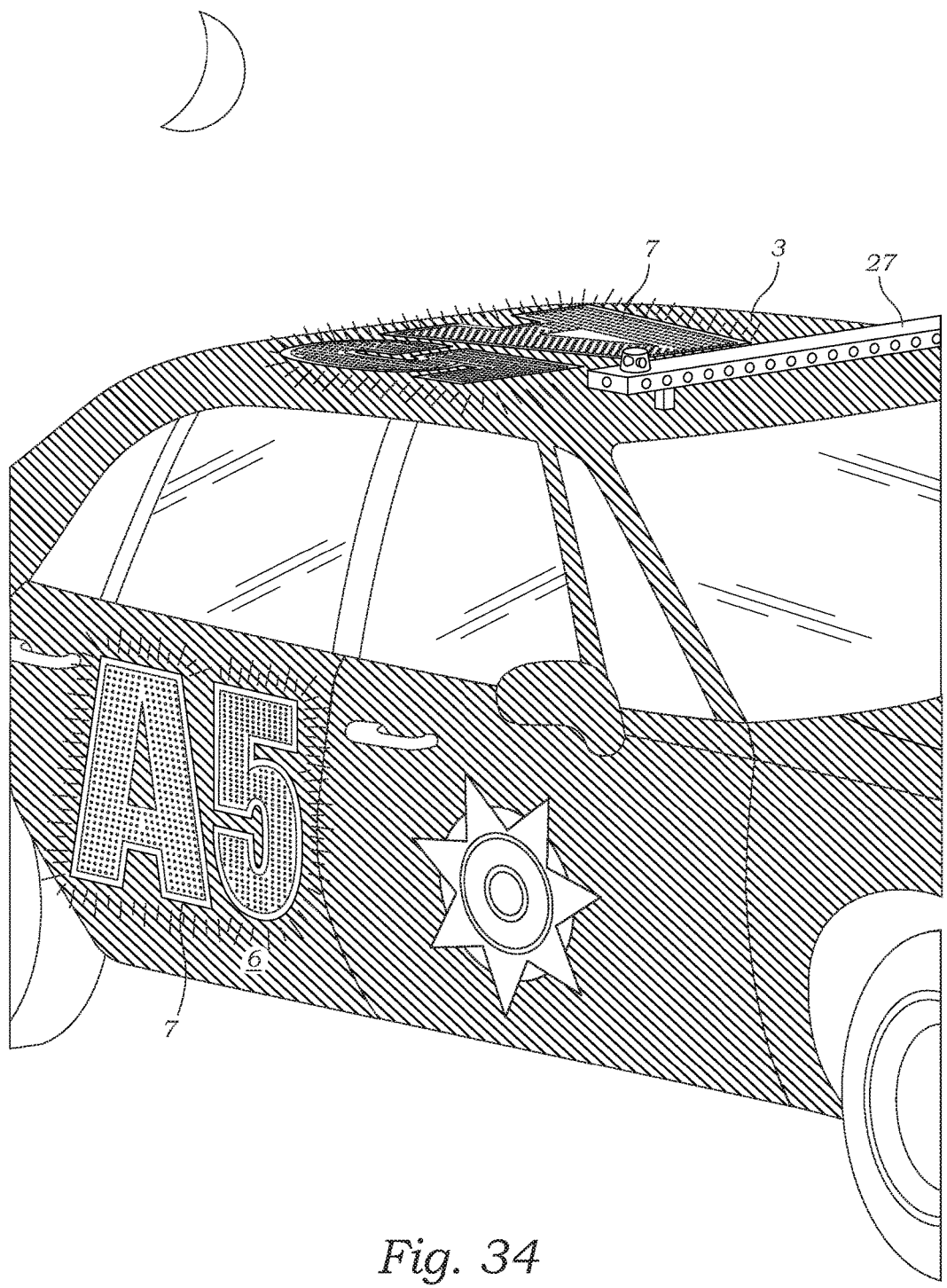
FIG. 34 is a perspective view illustrating the preferred luminescent panels of FIG. 30 mounted on an emergency response vehicle as seen during the nighttime.

Advantageously, by providing contrasting colors between the vehicle mounting surface 6 and the printed circuit board's top surface 87 and by minimizing the surface area of the LEDs 89 covering the printed circuit board 85, the luminescent planar sheet 7 has high visibility during both the daytime and nighttime. For example, FIGS. 33 and 34 illustrates a luminescent planar sheet 7 having a black printed circuit board affixed to a vehicle's white body panel. As illustrated in FIG. 33, during the daytime, the black surface 87 of the printed circuit board 85 can be easily on white of the vehicle's mounting surface 6. Conversely, as illustrated in FIG. 34 during the nighttime, the LEDs 89 are illuminated to provide highly visible alphanumeric characters.

Figure 32:
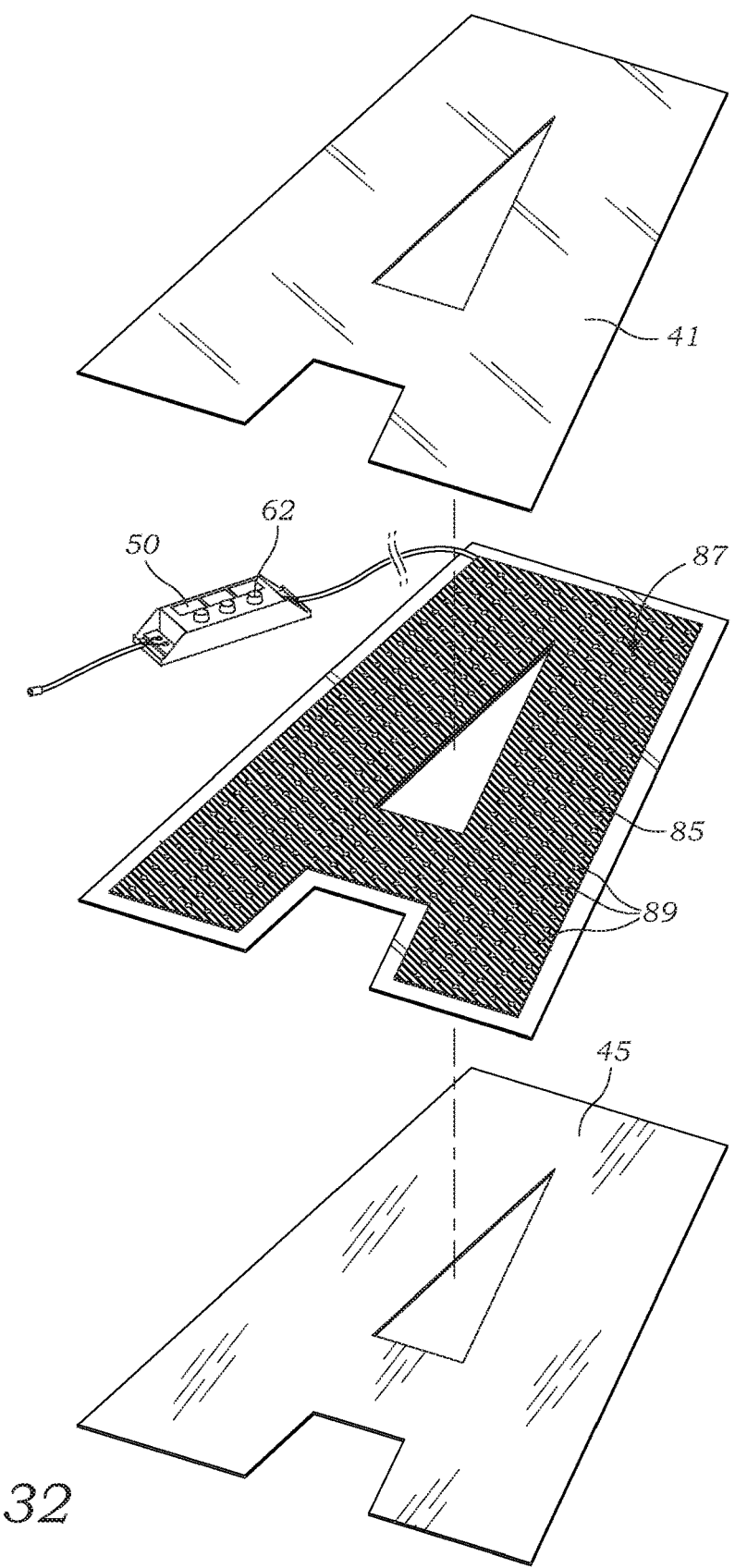
FIG. 32 is an exploded perspective view illustrating the preferred luminescent panel including a printed circuit board supporting surface mounted LEDs as shown in FIG. 30.

As illustrated in FIGS. 30-32, preferably the luminescent planar sheet includes an adhesive layer 45 for applying the planar luminescent sheet to the mounting surface 6 of a vehicle. Preferably, the adhesive layer 45 is covered by a peel-away sheet which can be easily peeled away by the installer when applying the luminescent planar sheet 7 to a vehicle's surface 6. In addition, it is preferred that the luminescent planar sheet include a protective coating 41 which incapsulates the LEDs. For this embodiment, it is preferred that the protective coating is a silicone resin which is poured upon the printed circuit board's top surface 87

| | | SMD 2835 and 3528 Preferred Embodiments | | | | |
|---|---|---|---|---|---|---|
| 508 mm Tall Character | Surface Area (mm$^2$) | Total # of LEDs | # of Visible LEDs | # of Infrared LEDs | Total Surface Area of SMD 2835 LEDs or SMD 3528 LEDs (2.8 mm × 3.5 mm)(9.8 mm$^2$) | LED Surface Area: Total Surface Area (%) |
| A | 87,365 | 472 | 361 | 111 | 4,625.6 | 5.3% |
| L | 58,115 | 385 | 265 | 120 | 3,773.0 | 6.5% |
| 2 | 87,386 | 491 | 345 | 146 | 4,811.8 | 5.5% |

| | | SMD 5050 Embodiment | | | | |
|---|---|---|---|---|---|---|
| 508 mm Tall Character | Surface Area (mm$^2$) | Total # of LEDs | # of Visible LEDs | # of Infrared LEDs | Total Surface Area of SMD 5050 LEDs (5.0 mm × 5.0 mm)(25.0 mm$^2$) | LED Surface Area: Total Surface Area (%) |
| A | 87,365 | 472 | 361 | 111 | 11,800.0 | 13.5% |
| L | 58,115 | 385 | 265 | 120 | 9,625.0 | 16.6% |
| 2 | 87,386 | 491 | 345 | 146 | 12,275.0 | 14.0% |

With reference to FIG. 35 and the table above, a preferred luminescent panel 7 in the shape of the letter "A" and having a height of 508 millimeters will have a surface area of 87,365 mm$^2$ and a total of 472 LEDs. Of these 472 LEDs, it is preferred that the majority of these LEDs 91, in this case 361, produce light with a peak wavelength in the visible when in a liquid state. The silicone resin is allowed to cure into a solid which is sufficiently transparent so that the color of the printed circuit board 85 can be easily seen.

Advantageously, as illustrated in FIGS. 30 and 35, the luminescent planar sheets 7 of the present invention are controlled by the control processor 50 so as to selectively illuminate in only the visible spectrum of light, or in only the invisible infrared spectrum of light, or simultaneously in both the visible and infrared light spectrums. Furthermore, and advantageously, the protective coating permits the passage of most of the visible light and infrared light produced by the luminescent panel, while blocking most of the ultraviolet light. Accordingly, the luminescent panel of the present invention is capable of producing visible light between 400 nanometers and 760 nanometers, or producing infrared light above 760 nanometers while not producing appreciable visible light below 760 nanometers, or producing both visible light, and infrared light.

Currently, non-illuminated indicia are adhered directly to the roof and trunk areas of emergency response vehicles. Similarly, the luminescent planar panels may be affixed to the vehicle's horizontal surfaces using adhesives or the like. Alternatively, the luminescent planar panels are affixed to a supplemental structure mounted on the vehicle. In a preferred embodiment, the vehicle is constructed to support a traditional roof rack, and to this end, the vehicle also includes four or more threaded bolt holes installed by the original manufacturer of the vehicle. If installed, the traditional roof rack of horizontally extending bars is removed. Instead, with reference to FIGS. 11-12, the vehicle is equipped with a planar plate 30 which includes flanges 35 that extend downwardly to mount to the vehicle bolt holes. Bolts, or other threaded fasteners, are employed to affix the planar plate 30 in place. Where the vehicle roof includes a plurality of longitudinal troughs, the bolt holes may be located in such troughs. For this construction, the planar plate is preferably constructed to include elongate flanges 35 along its left and right edges that will project into the troughs where vehicle threaded bolt holes are located. The flanges 35 include holes for receiving male fasteners which mount to the vehicle bolt holes.

With reference to FIGS. 18-22, in a preferred embodiment, the planar roof plate 30 has a top wall 31 including the top surface, two sidewalls 35 in the form of downwardly extending flanges, a front wall 33 and a rear wall 34. Small holes, ports or slots 32 may be drilled or formed into the top wall 31, left and right sidewalls 35, or front 33 and rear walls 34 for the routing of electrical wiring. However, it is preferred that the two sidewalls 35, front wall 33 and rear wall 34 are sized and constructed to engage the vehicle roof 4 substantially along their lengths to form a central cavity 51 between the vehicle roof 4 and top wall 31. It is preferred that any wiring to the light bar 27 or luminescent indicia upon the roof plate be located in the central cavity 51. Preferably, a single hole (not shown) is formed into the vehicle roof under the roof plate 30 to permit the routing of all wiring from the vehicle switching system and power supply to the light bar 27, luminescent indicia 9 and antennae 44. It is preferred that the cavity 51 be sufficiently high, at least one-eighth (⅛) inch and more preferably at least one-quarter (¼) inch, so as to allow the routing of traditional low voltage electrical cables. However, it is preferred that the height of the cavity 51 be minimal, less that two (2) inches and more preferably less than one (1) inch, to minimize the overall height of the planar roof plate 30.

In a preferred embodiment not shown in the figures, where the vehicle roof is not corrugated but instead relatively smooth, it is preferred that the planar roof plate's front and rear walls also be relatively smooth to conform and engage the vehicle's top surface. Unfortunately, vehicles having corrugated roofs result in the alphanumeric characters being warped when adhered to such roofs and difficult to read from above, such as by those in helicopters. As illustrated in FIGS. 18-27, in preferred embodiments, preferred roof plates 30 are specifically constructed to engage and conform to the corrugated features of a vehicle roof. Specifically, a vehicle's corrugated roof 4 includes recessed troughs 38 formed by projecting ridges 39. The troughs and ridges extend longitudinally from the front to the back upon a vehicle's roof and are provided to provide greater stiffness and support. For these embodiments, the planar plate's bottom surface, or front and rear walls, are not wholly planar. Instead, the planar plate's bottom surface or front and rear walls include a plurality of "teeth" 37 sized for projecting into the vehicle roofs troughs 38. The plate teeth 37 form channels 36 for receiving a vehicle roof's ridges 39.

As illustrated in FIGS. 18-22, a vehicle's corrugated roof may be relatively uniform from front to back providing troughs and ridges which extend longitudinally having the same width and depth where the roof plate 30 is intended to be mounted upon the vehicle roof 4. Accordingly, as illustrated in FIG. 19, for this embodiment the roof plate's channels 36 and teeth 37 are of approximately the same size at the roof plate's front as at the roof plate's rear. The roof plate's channels 36 and teeth 37 may extend longitudinally the entire length of the roof plate from front to back. Alternatively, as best illustrated in FIG. 19, the roof plate channels 36 and teeth 37 may be located only at the roof plate's front and rear edges so as to provide improved aerodynamics and support for the planar plate 30 upon the corrugated roof 4 of a vehicle 3. However, not all vehicles have vehicle troughs and ridges which extend with uniform width and depth. For example, as illustrated in FIGS. 23-29, the planar plate 30 may include a front or rear wall (illustrated as the rear wall 34) which includes a bottom surface formed to include channels 36 and teeth 37 for conforming with the corrugated roofs troughs 38 and ridges 39. However, towards the opposite edge of the roof plate, the vehicle's roof may not be corrugated. Accordingly, the planar plate 30 of this embodiment has an opposite edge (illustrated as the front wall 33) which does not include a plurality of teeth and channels.

The planar plate 30 may be constructed of various materials and manufactured by various methods as can be determined by those skilled in the art. For example, the planar plate illustrated in FIGS. 18-22 is preferably made of a durable plastic such as polyethylene, polystyrene, or acrylonitrile butadiene styrene which is machine or molded. An alternative preferred roof plate illustrated in FIGS. 23-27 is made of metal such as steel, aluminum or titanium and is stamped to form the plate's front wall and rear wall channels 36 and teeth 37.

As illustrated in FIGS. 11-16, the planar plate is preferably rectangular. However, the planar plate may incorporate subtle curves for improved aerodynamics or aesthetics. Furthermore, as illustrated in FIGS. 18-27, the planar plate 30 may include a notch or hole 32 for permitting the passage of a radio frequency antennae 44 typically mounted upon the roofs 4 of emergency response vehicles 3. Furthermore, as illustrated in FIGS. 28 and 29, the light bar 27 may also be mounted to the planar plate 30 to reduce or eliminate holes drilled into the vehicle after leaving the original manufacturer. For this embodiment, it is preferred that the system include electrical wiring 58 that connects the light bar 27 to the luminescent indicia 9.

While several particular forms of the invention have been illustrated and described, it will be apparent that various modifications can be made without departing from the spirit and scope of the invention. Accordingly, it is not intended that the invention be limited except by the following claims.

I claim:

1. A luminescent indicia assembly comprising:
a mounting surface displaying a first color;
a luminescent planar sheet affixed to said mounting surface and constructed to provide a non-luminescent and a luminescent indicia in the form of a letter or number, said luminescent planar sheet including a non-luminescent printed circuit board in the shape of said letter or number, said printed circuit board having one or more layers of non-electrically conducting substrates and a plurality of electrically conducting pathways; said printed circuit board having a top surface displaying a second color which contrasts with said mounting surface's first color, said luminescent planar sheet including a plurality of light sources surface mounted upon said printed circuit board which are electrically connected to said electrically conducting pathways, said light sources mounted substantially uniformly upon said printed circuit board so as to be arranged in the shape of said letter or number so that upon illumination of said light sources an illuminated letter or number is produced, and said light sources covering no more than 20% of the surface area of said printed circuit board's top surface so that at least 80% of said printed circuit board top surface can be seen; and
a power source for providing power to said one or more luminescent planar sheets.

2. The luminescent indicia assembly of claim 1 wherein the first color is selected from the group consisting of white, yellow and light green, and said second color is selected from the group consisting of black, brown, red, blue and dark green.

3. The luminescent indicia assembly of claim 1 wherein the first color is selected from the group consisting of black, brown, red, blue and dark green, and said second color is selected from the group consisting of white, yellow and light green.

4. The luminescent indicia assembly of claim 1 wherein said luminescent planar sheet includes an upper layer of substantially transparent plastic which encapsulates and covers said printed circuit board and light sources to provide a substantially smooth upper surface.

5. The luminescent indicia assembly of claim 1 wherein said light sources include light emitting diodes (LEDs) each having a surface area of 25 mm$^2$ or less.

6. The luminescent indicia assembly of claim 1 wherein said light sources include light emitting diodes (LEDs) each having a surface area of 10 mm$^2$ or less.

7. The luminescent indicia assembly of claim 1 wherein said light sources include a plurality of light emitting diodes (LEDs) which produce light at a peak wavelength that is not visible to the human eye.

8. The luminescent indicia assembly of claim 1 wherein said light sources include a plurality of light emitting diodes (LEDs) which produce light at a peak wavelength of about 850 nm.

9. The luminescent indicia assembly of claim 1 wherein said light sources include a first set of light emitting diodes which produce light that is visible to the human eye and a second set of light emitting diodes (LEDs) which produce light at a peak wavelength that is not visible to the human eye.

10. The luminescent indicia assembly of claim 1 wherein said light sources include a plurality of infrared light emitting diodes (LEDs) which produce infrared light at a peak wavelength that is not visible to the human eye, said plurality of infrared light emitting diodes (LEDs) located substantially uniformly at the periphery of said letter or number so that upon illumination of said infrared light emitting diodes (LEDs) an illuminated infrared letter or number is produced.

11. The luminescent indicia assembly of claim 1 wherein said light sources include a first set of light emitting diodes which produce light at a peak wavelength below 760 nm that is visible to the human eye and a second set of light emitting diodes (LEDs) which produce infrared light at a peak wavelength of about 850 nm, and said second set of light emitting diodes (LEDs) are located substantially uniformly at the periphery of said letter or number so that upon illumination of said second set of light emitting diodes (LEDs) an illuminated infrared letter or number is produced.

12. The luminescent indicia assembly of claim 1 wherein said light sources cover no more than 10% of the surface area of said printed circuit board so that at least 90% of said printed circuit board can be seen.

13. The luminescent indicia assembly of claim 1 wherein said light sources cover no more than 7% of the surface area of said printed circuit board so that at least 93% of said printed circuit board can be seen.

14. The luminescent indicia assembly of claim 1 wherein said mounting surface is the planar surface of a mobile vehicle.

15. The luminescent indicia assembly of claim 1 wherein said mounting surface is the planar surface of an emergency response vehicle.

* * * * *